United States Patent [19]

Sack et al.

[11] Patent Number: 5,259,766
[45] Date of Patent: Nov. 9, 1993

[54] METHOD AND SYSTEM FOR INTERACTIVE COMPUTER SCIENCE TESTING, ANAYLSIS AND FEEDBACK

[75] Inventors: Warren Sack, Santa Cruz, Calif.; Randy E. Bennett, Newtown, Pa.

[73] Assignee: Educational Testing Service, Princeton, N.J.

[21] Appl. No.: 807,008

[22] Filed: Dec. 13, 1991

[51] Int. Cl.⁵ ............................................. G09B 7/00
[52] U.S. Cl. ..................................... 434/362; 434/323; 434/327; 434/353; 364/191; 364/419.08
[58] Field of Search ............... 434/322, 323, 327, 335, 434/336, 362, 353; 364/419, 191

[56] References Cited

U.S. PATENT DOCUMENTS 4,887,212 12/1989 Zamora et al. .................... 364/419
5,059,127 10/1991 Lewis et al. ..................... 434/322 X
5,095,432 3/1992 Reed ................................. 364/419
5,111,398 5/1992 Nunberg et al. .......... 364/DIG. 1 X

OTHER PUBLICATIONS

Clocksin, W. F. and C. S. Mellish, "Programming in Prolog", Third, Revised and Extended Edition, 1987.
Henry I. Braun et al., Scoring Constructed Responses Using Expert System, Journal of Education Measurement, Summer 1990, vol. 27, No. 2, pp. 93–108.
Albert T. Corbett et al., Computer-Assisted Instruction and Intelligent Tutoring Systems: Shared Goals and Complementary Approaches, 1992, Chapter 3, pp. 73–109.
W. L. Johnson, Intention-Based Diagnosis of Novice Programming Errors (Morgan Kaufmann Publisher, Inc., Los Altos, Calif. 1986).

Primary Examiner—Richard J. Apley
Assistant Examiner—Joe Cheng
Attorney, Agent, or Firm—White & Case

[57] ABSTRACT

Disclosed is a method and system for administering to a student a problem in computer science for testing, analysis and feedback. The student is provided with an item pool of predetermined test problems to be selected by the student. The student inputs a solution in response to the problem selected, and the solution program is converted, by lexing and parsing, into an abstract syntax tree representation. Predetermined knowledge base patterns are selected from a knowledge base and compared against portions of the abstract syntax tree. Messages and a score are provided to the student which indicate the correctness or incorrectness of the solution program, as determined by the knowledge base patterns which were matched against the portions of the abstract syntax tree. The present method and system is especially qualified to analyze free-response test items.

22 Claims, 6 Drawing Sheets

METHOD AND SYSTEM FOR INTERACTIVE COMPUTER SCIENCE TESTING, ANAYLSIS AND FEEDBACK

A portion of the disclosure of this patent document contains material which is subject to copyright protection. The copyright owner has no objection to the facsimile reproduction by anyone of the patent disclosure, as it appears in the Patent and Trademark Office public patent files or records, but otherwise reserves all copyright rights whatsoever.

BACKGROUND OF THE INVENTION

This invention relates to a method and system for computer-based testing and computer-based analysis and feedback, and in particular to methods and systems which analyze, grade and diagnostically comment upon students' free responses to computer science problems.

The background for this invention is in two fields; standardized testing and analysis and feedback systems.

In the standardized testing field, large-scale standardized testing has long depended upon the administration by paper-and-pencil of multiple-choice test items, which can be stored efficiently and objectively by modern scanning technology. Such tests have several disadvantages, including that they cannot be dynamically adjusted to the skill levels of the examinees, that they must be scored in a central location where the scoring apparatus resides, and that they depend on problems that may not adequately represent the tasks which examinees may encounter in academica and work settings.

Advances in computer technology have recently been applied to the testing field. For example, adaptive administration techniques provide a test which is dynamically tailored to the skills of the examinee and instantaneously scored in order to allow the examinee to know how he or she performed as soon as the test is concluded. Additionally, systems have been developed for automatically grading examinees' responses to "free-response" items. A free-response examination is one in which the examinee must provide an uncued response to an open-ended question, for which there are no answers from which to select (as there are in the multiple-choice format).

None of the prior art systems have been successfully applied to testing in computer science. Thus, in order to assess an individual's ability to write computer programs, school systems, colleges and businesses continue to rely on paper-and-pencil tests which are graded individually by humans. These paper-and-pencil tests are necessarily of limited value because they require the examinee to demonstrate programming skills without a computer and are expensive to score because each examineers program must be graded by a human computer science expert.

Accordingly, computer-based systems are needed that will require the examinee to develop a computer program in response to a variety of programming problems. The system should be able to present various types of free-response test items, in response to which the examinee must provide entire programs or portions thereof. The system must be able to automatically evaluate and score the student's responses.

In the field of analysis and feedback, it is desired to be able to provide automated assistance to computer science students in the form of an intelligent computer-based analysis and feedback system. Such systems should be capable of reading programs which have been entirely or partially input by the student, identifying various errors therein and providing critiques back to the student.

The errors which a desired analysis and feedback system should be able to detect include syntax, semantic, and problem-specific errors. An example of a syntax error is a missing semi-colon at the end of a program line; syntax errors such as these are detected by standard compilers available in the prior art. Semantic errors are those such as the declaration of a variable to be an integer and using it as a character in the program.

Problem-specific errors, which are most difficult to diagnose, involve errors in programming logic. For example, a student may shift data through an array in the wrong direction. This problem-specific error is not detected by computer-based analysis and feedback systems currently available.

A computer-based analysis and feedback system which can diagnose problem-specific errors in programming logic as well as semantic and syntax errors would be ideally carried out by an expert system. An expert system, which is an application of the science of artificial intelligence, is used to diagnose problems in a specialized area which here is computer science. In particular, an expert system comprises two main components: an inference engine and a knowledge base. The inference engine contains general logical rules related to the computer science language under analysis. The knowledge base is a repository of data representing expertise in the computer science language, and is used by the inference engine to solve problems presented. Knowledge bases are constructed by knowledge engineers, who utilize information obtained from an expert in computer science in order to translate the expertise into a language a computer can comprehend.

The critiques to be provided by the desired expert system serve two purposes: (1) to assist students while they are debugging their programs, and (2) to be used by teachers as evaluations of the students' work. Thus, the desired expert system should be both a debugging aid and a grader of student programs.

Further, an automated analysis and feedback system should meet certain criteria. First, teachers need to be provided with a predetermined selection of programming exercises from which they can choose for inclusion in their curricula.

Second, the system needs to contain a large amount of information about the programming exercises that teachers might assign and the many and various problems that students may have in solving the exercises.

Third, a user-friendly interface, which would simulate the personal interaction of an instructor or teaching assistant, is desired. The interface should include techniques for highlighting pertinent text in a student program on the screen and for managing windows which display the text of the feedback to the student.

Fourth and finally, an intelligent analysis and feedback system must be founded upon a machine executable language that allows articulation of knowledge of programming that will be used by the program to diagnose and explain errors. Advice for students is articulated in this knowledge base language by knowledge engineers with expertise in instructing novice programmers.

The LISP-TUTOR software, developed by Anderson et al., and the PROUST software, developed by Johnson are examples of intelligent systems found in the prior art which attempt to address some, but not all, of the four criteria mentioned above.

The PROUST software provides only feedback on residual errors in the students' program and does not interactively guide the student in actual coding. However, the PROUST program's functionality has been convincingly demonstrated on only one set of student programs written to fulfill one programming problem. (Although Johnson was able to use the PROUST program to grade student solutions for a second programming problem, it was done only off-line, and only after many special purpose mechanisms were added to the PROUST software.) PROUST software provided only minimal coverage; teachers were provided with only one programming problem that could be used in their curricula; that same programming problem was the only one that PROUST could analyze and give advice on. Further, there existed no functional interface; messages from the PROUST program were simply stored in a text file.

The LISP-TUTOR software performs an analysis of each token, or word, immediately after it is input by the student. The LISP-TUTOR has specific predetermined word patterns stored in its memory, and compares each word input by the student in order to determine if the sequence follows one of the predetermined stored patterns. That is, in the LISP-TUTOR system, the knowledge base expects to encounter a program tree structure which is top-down, depth first, and left to right. The LISP-TUTOR is capable of detecting only the first error in this order. As such, LISP-TUTOR does not analyze the entire solution, as a whole, which would be presented by the student. Because the LISP-TUTOR system never allows a student's program to contain more than one bug, students using it are never faced with the normal "multiple-bug" demands of debugging, one of which demands is the perpetual uncertainty of not knowing how many different pieces of a program contain errors. In addition, students can only attempt to solve problems on the LISP-TUTOR system which were presented by the LISP-TUTOR system.

Accordingly, an object of this invention is to provide an analysis and feedback method and system for students in computer science which will allow them to interactively develop and debug their programs through immediate, on-line diagnostic feedback.

A further object of this invention is to provide a method and system for students in computer science to be given an examination in developing and debugging programs, by means of a computer, where the computer automatically evaluates the students' responses to test questions and assigns a numerical grade thereto.

A further object of this invention is to provide such a computer science analysis and feedback and testing system which will analyze students' programs after they have been completely entered and provide an accurate analysis for a wide range of potential correct and incorrect solutions.

A still further object of this invention is to provide a computer science analysis and feedback and testing system which will detect and provide an analysis of multiple errors in a program.

SUMMARY OF THE INVENTION

In accordance with these and other objects, the present invention provides a method of administering to a student via a computer a computer science problem which provides to the student an item pool comprising a plurality of predetermined test problems to be selected by the student. The student enters a program solution in response to the selected test problem, and the program solution text is recorded and then converted, via lexing and parsing, into an abstract syntax tree. Predetermined knowledge base patterns, indicative of expected correct and incorrect methods of implementing the program solution, are compared against portions of the abstract syntax tree until the predetermined pattern matches a portion of the abstract syntax tree. A text message correlated to the predetermined pattern matched to a portion of the abstract syntax tree is then provided to the student. In this manner, the abstract syntax tree is compared, piece by piece, against the predetermined patterns stored in the knowledge base. Messages associated with the knowledge base patterns which have been matched are then all provided to the student. As a result, the student is automatically provided with information embodied in the text messages which indicates how the solution text differs from a correct response.

The comparison stage of the present invention is greatly facilitated by the ability of the predetermined knowledge base patterns to be matched against portions of the abstract syntax tree which represent certain nodes of the abstract syntax tree which are prespecified to be as close or remote as desired. That is, the pattern matching function can account for "don't cares" within the abstract syntax tree, and the matching criteria can be as expansive or specific as desired. Thus, the pattern matching capabilities of the analytic component of the present invention allow the abstract syntax tree representation of the student's solution to be compared against prespecified knowledge bases in a much more flexible fashion than has been heretofore available. The analytic component is a pattern matcher for trees; it can match parts of trees and their spatial relationships. Rather than specifying nodes to be matched exactly, the present invention can provide for "don't care" situations and expand or contract its matching criteria in accordance with the specification of the knowledge engineer so that an abstract syntax tree representation need only fall within a certain specified range to be a match.

In a further embodiment of the present invention, portions of the abstract syntax tree are compared to the predetermined knowledge base patterns in the same fashion as above. Rather than flagging a text message, a score is stored which correlates to the predetermined patterns which are matched. As a result, the student's response to the predetermined test problem is automatically evaluated and scored, the score being indicative of the correctness or incorrectness of the solution text entered by the student in response to the test problem provided. The student can optionally be given as many predetermined test questions from the item pool as desired, and the score for each response thereto can be accumulated into a total test score. The number of test questions provided to a student can be predetermined, or the number can be determined dynamically as in the computer adaptive testing environment.

The computer system of the present invention which carries out the practice analysis and feedback embodiment as well as the computer science examination embodiment includes a computer/user interface which comprises an item pool of predetermined test problems to be selected by the student, output means for presenting to the student the particular test problem selected and for providing all other communications from the rest of the system, input means for allowing the student to enter and edit the solution and for providing all other communications to the rest of the system, and editor means for capturing the student's solution text to the particular test problem selected and allowing the student to edit the same. In addition to the computer/user interface, the system has at least one knowledge base comprising a set of predetermined patterns to be compared against the abstract syntax tree representation of the student's program solution. The system includes an analytic component, which comprises means for converting, by lexing and parsing, the student's program into an abstract syntax tree and means for comparing portions of the abstract syntax tree against the predetermined patterns from the knowledge base until portions of the abstract syntax tree match the patterns. In addition, a text message correlated to the predetermined pattern matched is provided to the student via the interface output means.

The present invention includes an item pool of test problems that present the examinee or student with a programming specification and ask him or her to construct, complete, or debug (depending upon the specification) a computer program or procedure. These programs and procedures are processed by the system's lexer and parser, which places them in an abstract syntax tree form amenable to diagnostic analysis and grading. The system also includes several knowledge bases that contain correct and incorrect "patterns" for solving each problem. These patterns are matched against lexed and parsed examinee responses. The analytic component directs the analysis of the lexed and parsed student response and produces both a partial credit score to indicate the degree to which the response is correct, and a message to give the student information about exactly which portions of the response were right and which were wrong.

Finally, the system includes an example compiler, which is an off-line software tool for developing new knowledge bases. The example compiler allows interactive compiling of knowledge base patterns by converting, via lexing and parsing, a model program into an abstract syntax tree representation, querying the user to select parts of the program against which the knowledge base pattern will be used to compare, and allowing the user to specify the node relations of the knowledge base patterns in accordance with desired match criteria.

This invention provides a means for testing and providing instructional practice with problems that resemble the tasks required of novice programmers in academic and work settings—problems that require the construction, completion, or debugging of a computer program. Such tasks are very different from multiple choice computer science problems, in that multiple-choice problems do not require the generation of a working computer pregtam. This is a significant improvement because it increases the validity of assessment by presenting tasks that more closely represent those encountered by examinees on the job.

DESCRIPTION OF THE PREFERRED EMBODIMENT

The preferred embodiment of the method and system of the present invention will be illustrated with reference to work at Educational Testing Service (ETS) which seeks to emulate the Advanced Placement Computer Science (APCS) examination in the Pascal programming language. While the preferred embodiment is designed to provide analysis of a program written in the Pascal language, it is understood that the present invention is not limited to Pascal; rather, programs written in other languages such as FORTRAN, BASIC, and C could be analyzed within the spirit and scope of this invention.

Referred to at ETS as the APCS Practice and Feedback System, the preferred embodiment employs a Disk-Operating-System (DOS) based personal computer, a color or monochrome display monitor, 640K of random access memory, and at least 2.5 megabytes of free hard disk space. Referring to the block diagram in FIG. 1, the preferred embodiment is comprised of a computer/user interface 102, an analytical component 112 for diagnostically analyzing and scoring students' solutions and for providing interactive feedback in the form of messages, and repositories of predetermined patterns called knowledge bases 120 for use by the analytical component 112.

Student Execution

Figure 1:
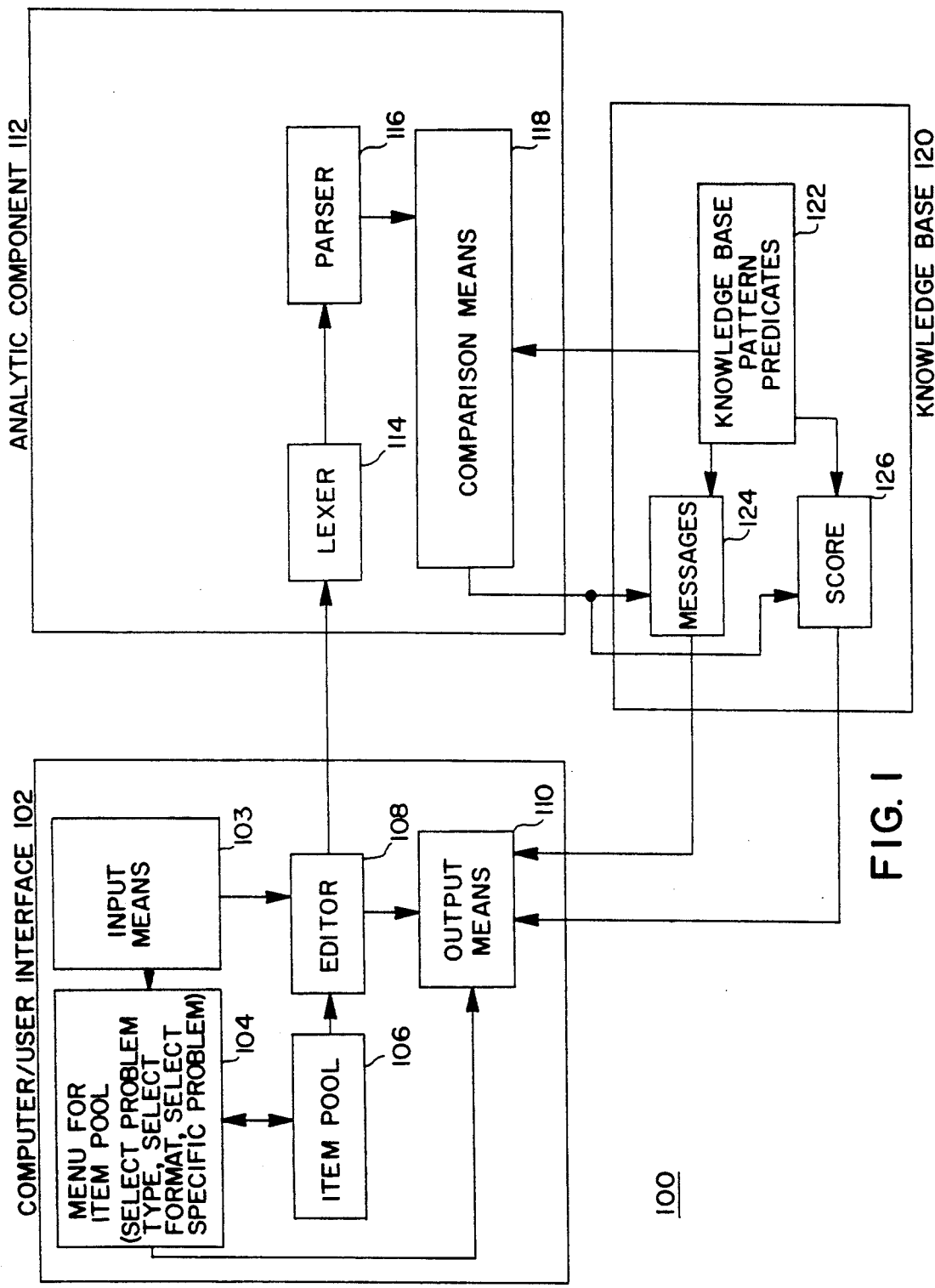
FIG. 1 is a block diagram of the system architecture of the preferred embodiment.
Figure 2:
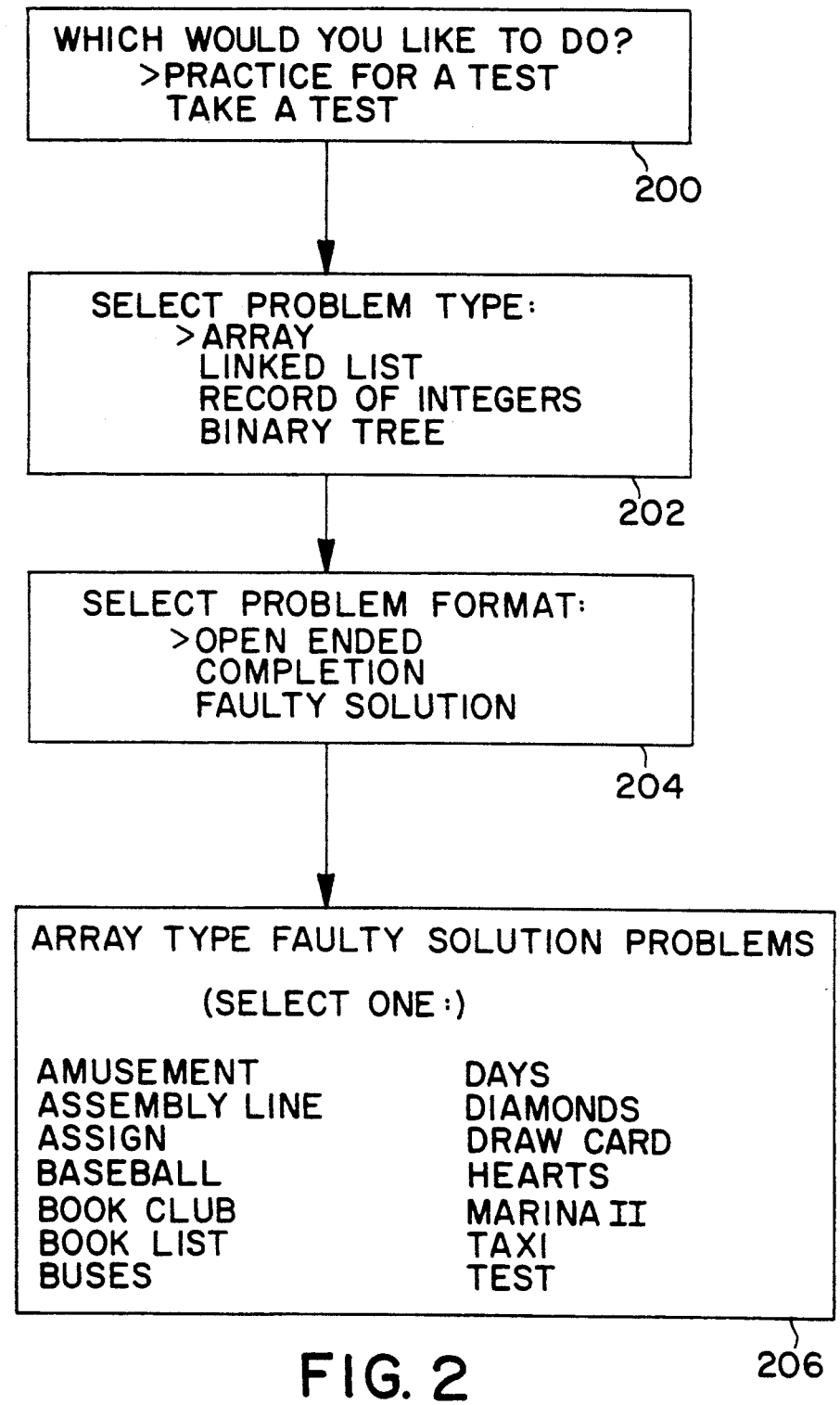
FIG. 2 is a flowchart showing how a student will execute the options presented by the computer/user interface of the preferred embodiment.

Referring generally to FIGS. 1 and 2, the computer science student will carry out the preferred embodiment in the following manner. Initially, the student will select, via input means 103, a predetermined test problem from an item pool 106 accessible from the computer/user interface 102. The item pool 106 is based upon, inter alia, problems taken from prior APCS examinations which have been made publicly available. Several prototype problems were selected to emphasize important data structures taught in the APCS curriculum. These data structures are arrays, linked lists, binary trees, and records. A series of isomorphic items were written for the preferred embodiment in three formats by using these prototype problems.

Isomorphic items present the same underlying solution structure although they may be embedded in different environments. Generally, students have considerable difficulty recognizing the underlying structure of a problem. Thus, by using isomorphic items, students are able to practice identifying problems with similar underlying structures and get repeated practice with important programming constructs and concepts.

The first prompt displayed by output means 110, which in the preferred embodiment is a monitor screen, enables the student to select either a Practice Mode or a Test Mode, as shown at block 200.

In the Practice Mode, the student will enter into the input means 103 a program solution in response to the selected problem; the student can then compile and run a program based on that solution at his or her option. The student will get the same choice of problems regardless of which mode has been selected. An indication of the choice made will be displayed at the top of the next two screens.

The next screen displayed by the output means 110, as shown at block 202, prompts the student to select one of the aforementioned problem types: an array problem, a linked list problem, a record of integer problem or a binary tree problem.

After the student has selected a problem type, the next screen displayed by the output means 110 prompts the student to select the problem format, as shown at block 204. The open-ended format presents a problem in response to which the student is to write the entire solution. The completion format presents a problem, variables and part of a solution; the student is to finish the solution using the code given. The faulty solution format presents a program that includes some errors which the student must detect and correct. Any of the three problem formats can be chosen for any of the four problem types available.

After the student has selected via the input means 103 the desired problem format at block 204, a screen will appear at the output means 110 which lists the specific predetermined test problems from the item pool 106 available for the problem type and format chosen by the student. Block 206 shows by way of example a list of available predetermined test problems for the array type faulty solution format problems as provided in the preferred embodiment.

Once the student has chosen a specific test problem, an editor 108 is invoked, and a problem description appears on the screen. Illustrative of the specific test problems which the student may encounter are Examples 1 through 3 below, which depict an array type open-ended problem called "Baseball Team," a linked list completion problem called "Flavors," and an array type faulty solution problem called "Draw Card."

In Example 1, the student must completely write the program solution; the editor contains no code to start with other than the program header including the variable declarations.

EXAMPLE 1

Array Type Open-Ended Problem: Baseball Team

At the end of spring training, a baseball coach must cut from the team all players whose batting averages are below .200.
Write a procedure called PickATeam that will do the following:

I. Accept as a parameter a list, Players, of type ListType.
II. Eliminate from the list all players with batting averages below .200. Batting averages are stored as integers 0 to 1000.
III. Return the team list, Players, with the remaining players in their original order.

*Note: no additional array storage can be used.
Use the following declarations and procedure call:

```
PROGRAM Baseball(input,output);
  CONST
    MaxLength = 1000;
  TYPE
    NumberList = ARRAY[1..MaxLength] OF integer;
    ListType = RECORD
        Average : NumberList;
        Length : integer
      END;
  VAR
    Players : ListType;
```

EXAMPLE 1-continued

Array Type Open-Ended Problem: Baseball Team

```
BEGIN
  PickATeam(Players)
END
```

In Example 2, the student must determine that certain code is missing, and then must enter that missing code accordingly.

EXAMPLE 2

Linked List Completion Type Problem: Flavors

An ice cream parlor is in the process of updating their inventory program. The recursive function FlavorCount is needed to count the number of flavors that the parlor has in stock. Complete the function so that it works as intended.

```
PROGRAM Parlor(input, output);
  TYPE
    Pointer = Node;
    Node = RECORD
        NumberOrdered : integer;
        NextFlavor : Pointer
      END;
  VAR
    Flavors : Pointer;
    NumFlavors : integer;

FUNCTION HowMany(First : Pointer) : integer;
BEGIN

FlavorCount := FlavorCount(First .NextFlavor) + 1
END;

BEGIN
  Num Flavors := HowMany(Flavors);
  Writeln(NumFlavors)
END.
```

In Example 3, the student must determine that certain code is incorrect, and must replace that incorrect code with correct code.

EXAMPLE 3

Array Type Faulty Solution Problem: Draw Card

A procedure has been written that will simulate drawing a card from a deck. Once a card is drawn from the top of the deck, it will be placed at the bottom of the deck and the other cards will be one position closer to the top (Note: n is the top, 1 is the bottom).

Correct the procedure so that is will work as intended.

```
PROGRAM CardGames(input, output);
  CONST
    Max = 100;
  TYPE
    CardCode = integer;
    DeckType = ARRAY[1..Max] OF CardCode;
  VAR
    Deck : DeckType;
    NumCards : integer;

PROCEDURE MoveCard(VAR C : DeckType; n : integer);
  VAR
    i : integer;
  BEGIN
    FOR i := n DOWNTO 2 DO
      C[i] := C[i-1]
  END;
```

EXAMPLE 3-continued

Array Type Faulty Solution Problem: Draw Card

BEGIN
  MoveCard(Deck, NumCards)
END.

After the code is written and/or the changes required by the problem are made in the editor 108, the student's solution is saved on a computer disk, and a diagnostic analysis of the program can then be invoked. In the diagnostic analysis, the code that has been entered is first examined for certain types of syntax errors. If there are syntax errors, the student will be provided with a message to help correct the error. If the program has no syntax errors it is then processed and analyzed to see if it properly solves the selected problem.

After the system performs the diagnostic analysis on the student's solution, the top half of the screen will display the original problem, the student's solution code (with any erroneous code highlighted), and any applicable diagnostic messages. The bottom half of the screen will display an editable copy of the student's solution code. The top half will not change and will be available as reference.

The student is then able to utilize the diagnostic messages provided by the system and edit the original solution. A second diagnostic analysis can then be invoked, with the most recent code moved to the top half of the screen with any applicable error messages. The student will get a copy of the most recently edited code on the bottom of the screen in order to make changes. This process can be repeated until a satisfactory solution is arrived at.

Examples of diagnostic messages a student may encounter are shown in Table A.

TABLE A

Sample Diagnostic Messages

Unable to find loop that checks each element of the array.

The variable i used as an array subscript must be initialized above the loop and must be incremented inside the loop.

The array and its size have to be passed into the procedure.

Unknown method used to eliminate zero element of the array.

An assignment statement to reset the length is missing/incorrect.

The solution is correct.

The student has the option of compiling a completed solution. In addition, the student can return to the menu screen that selects a problem format, block 204, by pressing the Escape key.

The system also employs several management utilities which allow the student to load a solution file from the disk (e.g., to continue work on a previously saved solution), save a file, zoom in on the highlighted text, and the like.

If the student is running in the Test Mode, the same procedure as the Practice Mode is generally followed. In Test mode, however, the student may not compile or run the solution program entered as in the Practice Mode.

In the both modes, diagnostic messages will be displayed on the screen in addition to a score, correlated to the correctness of the student's solution. After a fixed number of problems has been worked through by the student, all the scores from each problem can be totalled into one final test score in the Test Mode. Another approach to getting the final test score would be to use, instead of a fixed number of problems, a dynamic determination based upon a student's performance on items given, as in the computer adaptive testing environment.

System Architecture

The system architecture of the preferred embodiment of the present invention is shown in FIG. 1. The system comprises, at the top level, the computer/user interface 102, the analytic component 112, and the knowledge base 120.

The following is a general description of the operation of the preferred embodiment of the present invention. The computer/user interface 102, which comprises input means 103, an item pool menu 104, the item pool 106, the editor 108, and output means 110, provides all communication between the student and the analytic component 112 and knowledge base 120. The item pool 106 is a repository of predetermined test problems such as the ones illustrated in Examples 1 through 3 above. The student selects a particular test problem from the item pool 106 with reference to the item pool menu 104, which displays the selection options through the output means 110 as illustrated in blocks 100-106 of FIG. 1.

Once a particular predetermined test problem has been selected, it will be displayed to the student via the output means 110. The student will then, via the input means 103, enter and/or correct solution code in the editor 108 as appropriate. The preferred embodiment utilizes a text editor marketed by Sage Professional Software, although other configurable commercially available text editors will suffice. The student may then be able to compile the solution program in order to determine if there exist errors in syntax. After proper editing in accordance with the results of the compilation, the student's solution in text form is then passed from the editor 108 to the analytic component 112.

All processing performed by the analytic component 112, in conjunction with the knowledge base 120, is achieved in the preferred embodiment with logic programming. Logic programming is a means by which relationships between objects and data structures can be stored in a database and subsequently accessed in order to answer questions about, verify statements concerning, or make inferences from these object relationships. This is a descriptive procedure, rather than a conventional algorithmic type programming technique.

The present invention analyzes computer programs by lexing and parsing (decomposing), the program, storing results into a database, and matching portions of the patterns of the parsed student program against patterns previously loaded from the knowledge base 120 into the database. Thus, logic programming, rather than an imperative command-based sequentially executed language, is particularly suited to achieve the pattern matching of the present invention. In particular, the Prolog programming language (Arity Corp. Version 5.1) is used in the preferred embodiment, although it is contemplated that other logic programming languages could be used within the spirit and scope of the invention. For a general background, reference is made to the text *Programming in Prolog*, by W. F. Clocksin and C. S. Mellish, 3d Revised and Extended Edition (1987).

The analytic component 112 is comprised of a lexer 114, a parser 116, and pattern comparison means 118. The lexer 114 accepts the student program in text form from the editor 108 and outputs a list of tokens to the parser 116. The parser 116 then processes the tokens from the lexer 114 and outputs a set of associated nodes representative of the student program, which nodes are referred to collectively as an abstract syntax tree. The comparison means 118, which is an inference engine comprising a set of Prolog predicates, analyzes the abstract syntax trees and carries out a variety of pattern matching operations.

To carry out this pattern matching, the analytic component 112 calls upon the information stored in the knowledge base 120. The knowledge base 120 comprises a set of knowledge base pattern predicates 122, a set of diagnostic messages 124, and a set of scores 126. The knowledge base pattern predicates 122 correlate to portions of correct as well as various incorrect methods of solving the programming problem presented to the student. Each knowledge base pattern predicate 122 has associated with it a diagnostic message 124 and a score 126, such that when a knowledge base pattern predicate 122 is successfully matched against a part of the student's abstract syntax tree, the associated diagnostic message 124 is flagged for future display to the student via the output means 110, and the score 126 is accumulated in a register.

Analytic Component

The analytic component 112 will now be described in detail. The analytic component 112 is comprised of five files of Prolog predicates—ANALYZER.ARI, PARSER.ARI, LEXER.ARI, ENGINE.ARI, and UTILS.ARI—all of which are listed in the Source Code Appendix hereto. ANALYZER.ARI is the top-level file that consults the other four files into the Prolog database. The parser 116 is carried out by the file PARSER.ARI, which processes a list of tokens produced by the lexer 114 and outputs an abstract syntax tree into the Prolog database. The lexer 114 is carried out by the Prolog file LEXER.ARI, which is called by PARSER.ARI in order to produce the list of tokens. The comparison means 118 is carried out by the file ENGINE.ARI, which contains Prolog predicates used for analyzing, in conjunction with the knowledge base 120, the abstract syntax tree produced by the PARSER.ARI. Finally, the file UTILS.ARI contains some list and number manipulation and message formatting predicates used in the other four files of the analytic component 112.

The Prolog files of the analytic component 112 utilize a number of custom top-level Prolog predicates which are defined in the preferred embodiment in terms of other standard Prolog predicates. Explanations and technical definitions of these Prolog predicates are contained in the Predicate Definition section of this specification. In Prolog, the integer after the slash symbol of each predicate indicates the number of arguments for that predicate. For example, the predicate "above/2" uses two arguments which are described in the Predicate Definition section.

The Prolog predicates utilize data in nine various forms, called data types. Explanations and technical definitions of the data types are contained in the Data Type Definition section of this specification.

ANALYZER.ARI

ANALYZE.ARI is a file of Prolog predicates that reconsults, or loads, the remaining four files (ENGINE.ARI, UTILS.ARI, LEXER.ARI, and PARSER.ARI) into the Prolog database. In addition, the appropriate knowledge base is consulted into the Prolog database for subsequent pattern matching operations.

The top level predicate analyze/1 is defined in the file ANALYZE.ARI and accepts as its argument a file name containing a student solution program in Pascal. Analyze/1 lexes and then parses the file using the predicate parse/1, applies the current knowledge base 120 to the resulting abstract syntax tree by using the predicate top_level/1, and then writes out the resulting list of messages to a file by using the predicate output_messages/2 where the messages can be input to the computer/user interface 102 for display.

PARSER.ARI

The file PARSER.ARI defines the predicate parse/1 and is called by the analyze/1 predicate of ANALYZE.ARI. The function of parse/1 is to create an abstract syntax tree for the student program and store the abstract syntax tree in the Prolog database. An abstract syntax tree is a node which contains within it a set of associated nodes which represent the student program. A node is a data type which can be represented either as a nested list, or as a set of parent_child/2, next_left_sibling/2 and node_type/2 Prolog assertions. The node pointer that points to the root node of the abstract syntax tree can be determined by invoking the query root_node(PtrToRootOfAST).

LEXER.ARI

In order to generate an abstract syntax tree, the parse/1 predicate first calls the lexer 114 by invoking the predicate open_file_and_lex_tokens/2 found in LEXER.ARI. The predicate open_file_and_lex_tokens/2 opens the student Pascal program, executes the lex/2 predicate on the text contained therein to create a list of tokens, and closes the file. The tokens are asserted into the second argument of the predicate open_file_and_lex_tokens/2.

A token is a data type which is a two-element list. The first element is the symbol found by the lexer, and the second element is the line number in the file on which the symbol was found. For example, if the following file called TEST.PAS is input:

| 1 | { Definition of the program called foo} |
| 2 | PROGRAM foo (INPUT,OUTPUT); |
| 3 | |
| 4 | VAR |
| 5 | i: INTEGER; |
| 6 | |
| 7 | BEGIN |
| 8 | i:= 1 |
| 9 | END |
| 10 | { End of the text of the program} |

Execution of the open_file_and_lex_tokens/2 predicate will result in the following:

?- open_file_and_lex_tokens ('test.pas', Tokens).

-continued
```
Tokens = [[    program,2],[foo,2],['(',2],[input,2],[',',2],
               [output,2],[')',2],[';',2],
               [var,4],
               [i,5],[:,5],[integer,5],[';',5],
               [begin,7],
               [i,8],[:,8],[=,8],[1,8],
               [end,9],['.',9],[eof,9]] →;
no
```

As can be seen, the variable "token" has been instantiated to indicate that the symbol "program" is found at line 2, the symbol "foo" is found at line 2, ... the symbol "begin" is found at line 7, and so on. Thus, the list of tokens contained in the variable "tokens" describes the student program by listing each symbol of the program and its line location.

The program file which was input in the predicate open_file_and_lex_tokens/2 is processed by the Arity Prolog special predicates open/3 and close/1. The lexer invoked is defined in the predicate lex/2, which is modelled after the lexer defined in Clocksin & Mellish, pp. 101-103. This has been modified to include predicates to strip out Pascal comments and to define which characters constitute special symbols in Pascal (e.g., ';', '.', etc.). One extra token is added to the end of all lists of tokens: [eof,N], where N is an integer denoting the last line of the file lexed.

Abstract Syntax Tree

Once the student's program has been lexed into a list of tokens, the parse/1 predicate processes the list of tokens into an abstract syntax tree. The abstract syntax tree is a description of a node in terms of its associated nodes. A node is a data type in Prolog which is defined in terms of its type, its location pointer, and its children nodes. The children nodes are also defined in terms of their type, their location pointers, and their children nodes, which are the grandchildren nodes of the original node. A node is set forth below in BNF form:

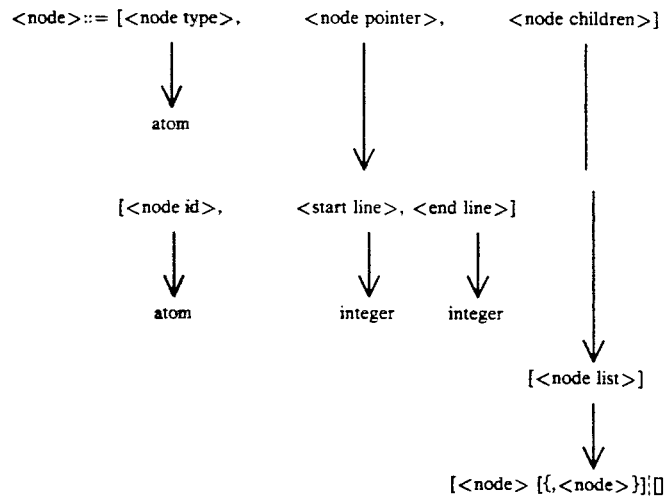

When the list of tokens for TEST.PAS is processed by parse/1, the following abstract syntax tree results:

```
[program,[node22,2,9],
  [[foo,[node1,2,2],
     []],
   [prog_header,[node4,2,2],
     [[input,[node2,2,2],
        []],
      [output,[node3,2,2],
        []]]],
   [block,[node21,4,9],
     [[label_decl_list,[node5,9999999,9999999],
        []],
      [const_decl_list,[node6,9999999,9999999],
        []],
      [type_decl_list,[node7,9999999,9999999],
        []],
      [var_decl_list,[node12,4,5],
        [[var_decl,[node11,5,5],
           [[defined_type,[node10,5,5],
              [[integer,[node9,5,5],
                 []]]],
            [i,[node8,5,5],
              []]]]]],
      [procedure_and_function_list,[node13,9999999,9999999],
        []],
      [begin,[node20,7,9],
        [[:=,[node19,8,8],
           [[variable,[node17,8,8],
              [[i,[node15,8,8],
                 []],
               [empty,[node16,8,8],
                 []]]],
            [1,[node18,8,8],
              []]]]]]]]]]]
```

Figure 4:
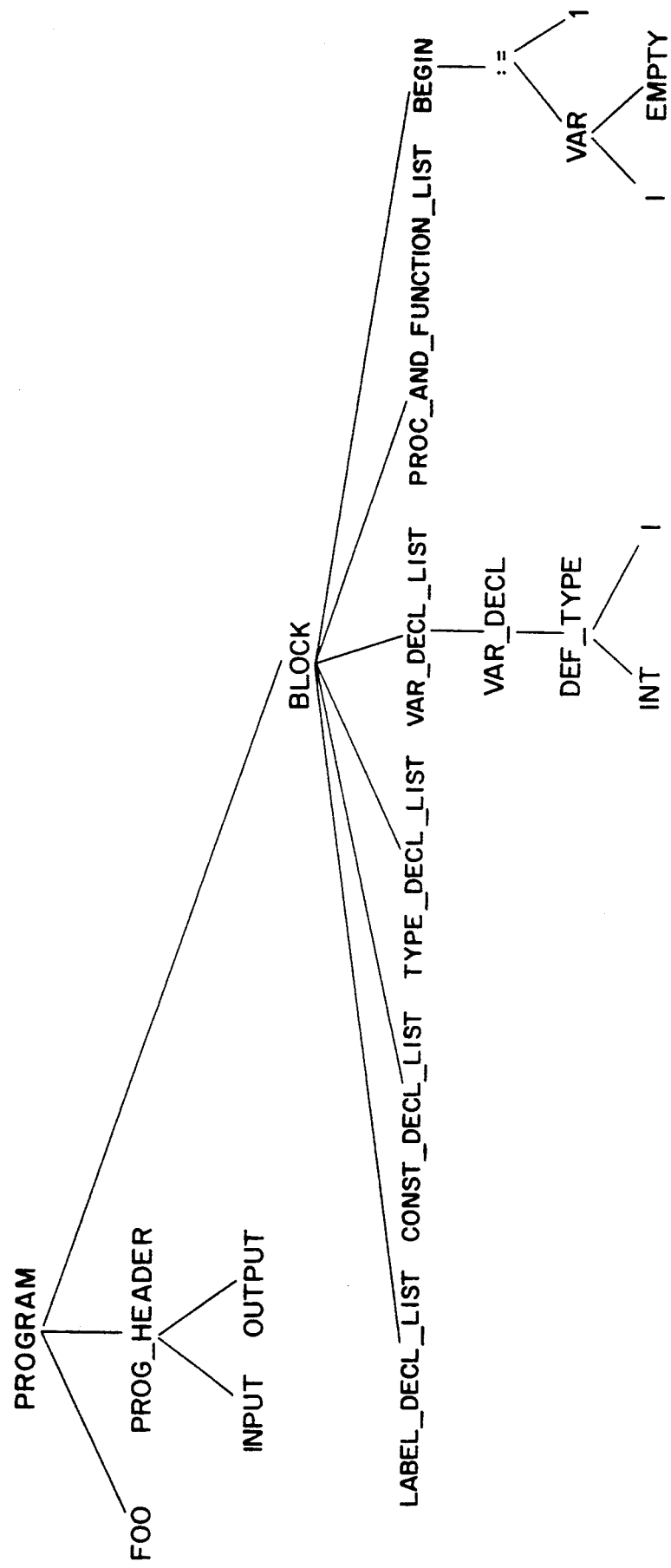
FIG. 4 is a tree representation of a program node generated by the parser of the preferred embodiment.

This abstract syntax tree can also be viewed pictorially as a tree of nodes, as shown in FIG. 4. By analyzing the abstract syntax tree, it can be seen that the top level node has a node type "program," a unique ID "node22", starts on line 2 and extends to line 9 of the program, and has three children whose types are "foo", "prog_header", and "block". Each of the children can be similarly described; for example, the child node "prog_header" has a unique ID "node4", starts and ends on line 2, and has two children "input" and "output".

Line numbers of 9999999 indicate that the node does not appear in the text of the Pascal program; rather, the node was created by parse/1 for internal accounting procedures, or as a "filler" to canonicalize the parent node. In the abstract syntax tree above, a node has been created for a "procedure_and_function_list" even though no procedures or functions exist in the Pascal program parsed; this was done simply so that all nodes of type "block" contain a child of type "procedure_and_function_list".

Abstract syntax trees are most conveniently viewed as nested lists, but are not actually stored in the Prolog database in that form. Instead, parse/1 creates and stores abstract syntax trees as sets of Prolog assertions. The four types of assertions which are used to completely describe and store abstract syntax trees are root_node/1, parent_child/2, next_left_sibling/2, and node_type/2. All io previously existing parent_child/2, next_left_sibling/2, node_type/2 and root_node/1 assertions are deleted from the Prolog database to insure that all such assertions in the current database refer to the most recently parsed Pascal program. In addition, the predicate parse/1 will only return the assertions into the database if the Pascal program is syntactically correct. Should the program called in the argument of parse/1 be syntactically deficient, parse/1 will return either the word "no" or display an error message.

Root_node/1 defines the top level node in the abstract syntax tree. Thus, for TEST.PAS, a root_node/1 query would result as follows:

?—root_node(PtrToTopLevelNode).
PtrToTopLevelNode=[node22,2,9]

This is the pointer to the node "program" in TEST.PAS. This can be confirmed by invoking the predicate node_type/2:

?—node_type(TypeOfTopLevelNode,[node22,2,9]).
TypeOfTopLevelNode=program→

A parent_child/2 query for the children of the top level node will provide a list of the node pointers to the nodes that are the children of the top level node "program":

?—parent child([node22,2,9],Child).
Child=[node1,2,2]→;
Child=[node4,2,2]→;
Child=[node21,4,9]→;

Again, by viewing the abstract syntax tree, it is seen that these node pointers refer to the top level node's three children: "foo", "prog_header", and "block".

The predicate next_left_sibling/2 can be invoked in order to determine how the children nodes are juxtaposed:

?—next_left_sibling([node1,2,2],Sibling).
Sibling=[node4,2,2]→
and
?—next_left_sibling([node4,2,2],Sibling).
Sibling=[node21,4,9]→

The results of these queries indicate that the node "foo" is immediately to the left of the node "prog_header", which is itself immediately to the left of the node "block".

Thus, by querying the Prolog database with the required number and combinations of the root_node/1, parent_child/2, next_left_sibling/2, and node_type/2 predicates, one can access all information regarding the abstract syntax tree which would be embodied in its nested list format.

The predicate recreate_node/2 is useful since it allows the recreation of any node as a nested list. Thus, to view the "prog_header" node as a nested list:

```
?- recreate_node([node4,2,2],NodeAsList).
NodeAsList =   [prog_header,[node4,2,2],
               [[input,[node2,2,2],
               []].
               [output,[node3,2,2],
               []]]] →
```

ENGINE.ARI

The file ENGINE.ARI, which is consulted into the Prolog database by the top-level file ANALYZER.ARI, functions as an inference engine to search the abstract syntax tree generated by PARSER.ARI and perform pattern matching operations in conjunction with the assertions stored in the knowledge base 120. ENGINE.ARI defines certain "node relation" predicates, as described in the Predicate Definitions section, and provides for the match/1 predicate for pattern matching between portions of the abstract syntax tree and the knowledge base.

Knowledge Base

The knowledge base is a repository of correct and incorrect methods of solving a particular programming problem, and is written as a set of Prolog predicates called knowledge base pattern predicates. A knowledge base pattern predicate 122 is a Prolog predicate of data type "knowledge base pattern," which is consulted into the Prolog database and matched by the analytic component 112 against portions of the abstract syntax tree of the student's Pascal program. Each programming problem made available to the student requires its own corresponding knowledge base 120 to be consulted into the Prolog database. Some sets of knowledge base pattern predicates 122 can be shared among different knowledge bases 120 depending upon common features of the various problems.

Attached to some of the knowledge base pattern predicates 122 are messages 124 in English textual form. The messages 124 provide feedback to the student regarding the solution he or she has entered in response to the selected problem.

Knowledge Engineering

A knowledge base for a particular programming problem is created by a knowledge engineer, who should have experience in critiquing students' Pascal programs. Knowledge bases are succinct descriptions of the many and various ways in which students are apt to correctly and incorrectly solve a given programming problem. Thus, a knowledge engineer needs to have a working knowledge of what sorts of solution variants students are likely to arrive at.

It is useful for the knowledge engineer to develop knowledge bases with a computer having a large screen, along with a windows-type software environment and a mouse input device. Thus, in the preferred embodiment, a MAC II personal computer is used for knowledge base development. The knowledge bases are then ported to the DOS-based computer used to execute the entire system.

In creating a knowledge base, the knowledge engineer, typically follows the following steps (not necessarily in the order given below):

By examining a large corpus (e.g., one hundred or more) of student solutions to a given programming problem, the knowledge engineer is able to get a good idea of the sorts of programs that the knowledge base will need to be able to account for. Existing knowledge bases may be perused to find parts that may be effectively reused in the construction of the new knowledge base.

Exemplars from the corpus of student solutions are selected according to typicality. Normally, there are a handful of programs which exhibit a large part of the variance exhibited in the types of solutions arrived at by the majority of students represented in the corpus. Starting from these exemplars, the knowledge engineer can start to describe, as patterns for the knowledge base, the characteristic components of the program solutions. In the preferred embodiment, an off-line utility called the example compiler assists the knowledge engineer with this phase of the development process.

Patterns created are abstracted and generalized into sets of Prolog predicates that can then be tested against other student programs in the corpus of student solutions. At this point, standard software engineering techniques of top-down design can be applied to the problem of structuring the knowledge base.

The patterns in a knowledge base have attached to them a message which is reported to the student if the pattern successfully matches against some part of the student's program. In order to author pedagogically effective messages, it is recommended that knowledge engineers work closely with Pascal instructors to edit and rephrase messages included in the knowledge bases.

After preliminary testing and consultations with Pascal instructors, the knowledge engineer ports the knowledge base to the DOS-based computer, where the knowledge base is compiled and then tested against another corpus of student programs. If testing goes well, the knowledge base is ready for use.

To illustrate the process of outlining a knowledge base, reference is made to the Rotate problem, which is available in the preferred embodiment, as shown in Table B.

TABLE B

The Rotate Problem

Write a procedure that rotates the elements of an array "s" with "n" elements so that when the rotation is completed, the old value of s[1] will be in s[2], the old value of s[2] will be in s[3]. . . . , the old value of s[n-1] will be in s[n], and the old value of s[n] will be in s[1]. The procedure should have "s" and "n" as parameters. You may assume that the type "Item" has been declared and "s" is of the type "List" which has been declared as List = array [1..Max] of Item.

The Rotate problem essentially asks students to write a program to rotate each element of an array one position to the right. In Table C below is an incorrect sample solution to the Rotate problem, which uses one loop and one temporary variable. Note that the loop counts upwards, where, to be correct, it should count downwards. Thus, the program will incorrectly copy the contents of S[2] into all of S[3], S[4], . . . S[N].

TABLE C

Incorrect Sample Solution to the Rotate Problem

```
PROGRAM Foo (INPUT, OUTPUT);
CONST Max = 100;
TYPE Item = INTEGER;
  List = ARRAY[1..Max] OF Item;
VAR PassedAsS : List;
  PassedAsN : INTEGER;
PROCEDURE Rotate (VAR S : List; N : INTEGER);
  VAR Temp : Item;
    I : 1..Max;
  BEGIN
    Temp := S[N];
    FOR I := 2 TO N DO BEGIN
      S[I] := S[I - 1]
    END;
    S[1] :=Temp
END;
```

TABLE C-continued

Incorrect Sample Solution to the Rotate Problem

```
BEGIN
  Rotate(PassedAsS, PassedAsN)
END.
```

The major design decisions faced by students attempting to solve the Rotate Problem include: whether to use one array or two; whether to use one loop or two; whether to have the loop(s) count up or down; and what kind of and how many temporary variables to use.

As a first step towards developing a knowledge base for a new programming problem, the knowledge engineer should first record all the different sorts of potential solutions as he or she can determine. By sorting the solutions generated into categories, one often ends up with a list of major design decisions for the problem, like the ones listed above for the Rotate problem. If the knowledge engineer then looks through a large selection of student solutions to the problem, he or she will likely find solutions that he or she wasn't able to predict a priori. If unexpected correct solutions aren't found, then, at the very least, unexpected buggy solutions will be found in the students' solutions.

By highlighting some of the more important pieces of the code and by articulating some of the relationships between statements in the sample program, we can start to describe the sorts of pattern predicates that the knowledge base will need to contain. First, we describe what each statement in the body of the procedure does:

```
BEGIN
    store_to_temp: The value of S[N] is put into a
  temporary variable.
      Temp := S[N];
    loop: The loop operates on each element of the array.
      FOR I := 2 TO N DO BEGIN
    shift: The values in the array are shifted one
  position to the right.
      S[I] := S[I - 1]
    END;
    retrieve: The former value of S[N] is retrieved from
  the temporary variable and installed in S[1].
      S[1] := Temp
END:
```

By annotating the body of the procedure in this manner, we have identified four of the major pieces necessary for a solution which uses one temporary variable and one loop:

store to temporary variable, loop, shift array elements right, and retrieve from temporary variable.

In addition, the loop of the program in Table C contains an error; it counts up instead of down. The error is observable upon examination of the relationship between the expression used in the shift statement and the direction of the loop. Moreover, the array needs to be passed into the procedure before the procedure can rotate the elements of the array. Thus, we can refine the outline of the Rotate Knowledge Base further:

Rotating an array involves:

passing parameters into a procedure, and shifting the array.

Passing parameters into a procedure entails checking to make sure that:

the array and the size of the array are passed into the

Shift: one of the following can be used as the mechanism that shifts the array elements one place to the Correct Method:

A[LHSExpr]:=A[RHSExpr] is used to shift the array elements where LHSExpr=RHSExpr+1, A[n] is stored into a temporary variable above the loop, and A[n] is retrieved from the temp below the loop and put into A[1]

The loop counts downward from n to 1.

Buggy Method:

A[LHSExpr]:=A[RHSExpr]where LHSExpr=RHSExpr+1,

A[n] is stored into a temporary variable above the loop, and

A[n] is retrieved from the temp below the loop and put into A[1]

The loop counts upwards, consequently, the first element of the array is incorrectly copied into the rest of the elements.

Note that not only has more detail been added to the outline with respect to what kinds of statements are expected, but also, information has been added which specifies relations between the constituent parts. For example, A[N] should be stored above the loop.

The outline above is still incomplete. It is also possible to solve the Rotate problem with a loop counting upwards, with two loops, with two temporary variables, or with an extra array used as intermediate storage during the process of rotation.

The following outline describes the Rotate knowledge base of the preferred embodiment. It was constructed after many student programs had been examined and analyzed for errors and alternative solution methods.

Rotating an array involves passing parameters into a procedure, and shifting the array Shifting the array can be done using either one array, or two arrays.

If one array is used to shift the array, then within a loop one should be able to find a shift expression If two arrays are used to shift the array, then either two loops are used, or one loop is used Passing parameters into a procedure entails checking to make sure that the array and the size of the array are passed into the procedure Shift expression: one of the following can be used as the mechanism that shifts the array elements one place to the right:

Correct Method:

A[LHSExpr]A[RHSExpr]is used to shift the array elements where LHSExpr=RHSExpr+1, A[n] is stored into a temporary variable above the loop, and A[n] is retrieved from the temp below the loop and put into A[1]

The loop counts downward from n to 1.

Correct Method:

Temp2:=A[RHSExpr], and

A[LHSExpr]:=Temp1, and

Temp1:=Temp2

A[1] is stored into Temp1 above the loop, and

A[2] is stored into Temp2 above the loop

A[1] gets Temp2 below the loop

The loop counts upward.

Buggy Method:

A[LHSExpr]:=A[RHSExpr]

where LHSExpr=RHSExpr+1,

A[n] is stored into a temporary variable above the loop, and

A[n] is retrieved from the temp below the loop and put into A[1]

The loop counts upwards, consequently, the first element of the array is copied into the rest of the elements.

Buggy Method:

A[LHSExpr]:=A[RHSExpr]

where RHSExpr=LHSExpr+1, which forces the elements of the array to be shifted left rather than right.

If two arrays and two loops are used to rotate the array, then either:

Correct Method:

in the first loop elements from the first array are copied into the second array, offset by one position, then in the second loop elements of the second array are copied back into the first array in their offset positions, or Correct Method:

in the first loop elements from the first array are copied into the second array, then in the second loop elements of the second array are copied back into the first array offset by one position, or Buggy Method:

in the first loop elements from the first array are copied into the second array, offset by one position, but then in the second loop elements are not copied back into the first array in their offset positions, or Buggy Method:

in the first loop elements from the first array are copied into the second array, but then in the second loop elements of the second array are not copied back into the first array offset by one position.

If two arrays and one loop are used to rotate the array, then statements of the form A2[LHSExpr1]A1[RHSExpr1], and A1[LHSExpr2]A2[RHSExpr2] are inside the loop, and Correct Method:

The loop counts upward,

LHSExpr1=RHSExpr1,

LHSExpr2=RHSExpr2+1, and

LHSExpr1=LHSExpr2, or

Correct Method:

The loops counts downward,

LHSExpr1=RHSExpr1,

LHSExpr2=RHSExpr2+1, and

RHSExpr1=RHSExpr2, or

Correct Method:

The loop counts upward, and

UiSExpr1=RHSExpr1+1,

LHSExpr2=RHSExpr2, and

LHSExpr2=RHSExpr1, or
Correct Method:
The loop counts downward,
LHSExpr1=PHSExpr1+1,
LHSExpr2=RHSExpr2, and
LHSExpr1=LHSExpr2, or
Buggy Method:
The loop counts upward,
LHSExpr1=RHSExpr1, but
in the second assignment statement the elements are not restored
into the original array, A1, by offsetting their position one to the right.
Buggy Method:
The loop counts downward,
LHSExpr1=RHSExpr1, but
in the second assignment statement the elements are not restored
into the original array, A1, by offsetting their position one to the right.
Buggy Method:
The loop counts upward,
LHSExpr1=RHSExpr1+1, but
in the second assignment statement the elements are not restored
into the original array, A1, from the storage array, A2.
Buggy Method:
The loop counts downward,
IJiSExpr1=RHSExpr1+1, but
in the second assignment statement the elements are not restored
into the original array, A1, from the storage array, A2.

Two criteria need to be balanced during the construction of a knowledge base: (1) the need to render the knowledge base so that it can be efficiently matched against student programs, and (2) the requirement that the knowledge base represent a set of plausible decompositions of the programming problem. As to the representation of the possible decompositions, it is desirable that a knowledge base describe, in as problem independent form as possible, the various tasks and subtasks that must be solved by a student program. A problem independent vocabulary for problem decomposition is desired because it forces pieces of the knowledge base into a form general enough to be of use in the construction of other knowledge bases. That is, knowledge base predicates should be written in a form as general as possible so that they can be reused later. The Rotate knowledge base outlined above does not contain many problem independent pattern predicates. However, for example, in the outline of the Rotate knowledge base it has been assumed that a pattern predicate will be available to match a loop. The example Rotate student solution examined earlier contained a FOR loop. However, the loop could be implemented in Pascal as a REPEAT-UNTIL, a WHILE, a FOR, or with tail recursion. The loop pattern predicate used in the Rotate knowledge base can match against several different forms of iteration and, thus, can be of use in the construction of other knowledge bases where a loop is called for in the problem statement.

The construction of generalized pattern predicates conflicts with the criterion that knowledge bases be as small and as fast as possible. As is usually the case with all software, the criteria of efficiency and generality are in tension with one another. When two or more knowledge bases need to be constructed, it is recommended that the knowledge engineer identify subtasks common to all of the programming problems and then outline the knowledge bases with the intention that some of the code for the knowledge bases will be shared between them.

Note also how the structure of the outline of the Rotate knowledge base does not necessarily reflect the hierarchy of decisions that have to made by the students in creating a solution to the Rotate problem. Rather, the outline reflects the order in which pieces of the student programs should be matched. Ideally, the student program would be analyzed in a manner isomorphic to the order in which it was constructed by the student. Such an isomorphism would be ideal because it would allow one to examine the relationship between a knowledge base and a cognitive model of the problem solving processes applied by a given student solving a given programming problem.

Efficiency, however, does not permit this isomorphism between cognitive model and knowledge base. Thus, for example, checking the parameters passed into the procedure is one of the first things done by the Rotate knowledge base because it allows the binding of some pivotal variables in the pattern predicates that are used, subsequently in the analysis of a student program, to direct searches through the student's code. That is, passing parameters is at the top level of the Rotate knowledge base, not because it is descriptive of a top level decision that has to be made by student programmers, but, rather, because matching parameters right away makes it easier for the knowledge base to analyze the rest of the student's program.

During development of a knowledge base, the knowledge engineer repeatedly amends the knowledge base so that it can analyze a wider range of student solutions; and the knowledge engineer revises the knowledge base so that it does its pattern matching on the student program quicker and more efficiently. Maintaining an outline to reflect the changes imposed on the knowledge base can give the knowledge engineer a way-of planning and explaining the structure of the knowledge base. Construction of Knowledge Base Pattern Predicates The knowledge base pattern predicate 122 is primarily constructed out of three types of Prolog instructions: match/1 instructions, node relation predicates (such as above/2, nth_child/3, etc.), and messages/2.

Match/1

By using the predicate match/1, knowledge base pattern predicates 122 can be matched against the abstract syntax tree produced by parse/1. The purpose of match/1 is to search an abstract syntax tree to find specific node types and node pointers within the tree. Match/1 does not return nodes from the Prolog database; rather, it binds variables contained in its argument to specific node types and node pointers. The argument of match/1 is written in nested list syntax.

The argument for match/1 is written in the following general format:

[<type>,<ptr>,<children>]

If a variable is desired in the <children> position, the generic underscore variable should be used:

[<type>,<ptr>,_]

Essentially, match/1 destructures its node pattern argument into a three element list: Type, Ptr, and Children. It first fetches any node pointer in the data base of the type Type (i.e., node—type(Type,Ptr)). It then invokes the predicate match/3, which is match(1,Children, Ptr). Match/3 takes 3 arguments: match(N,Children,ParentPtr), where N is an integer, Children is a list of node patterns, and ParentPtr is a node pointer.

Match/3 terminates successfully when the argument Children is an empty list. Otherwise, it destructures the first child listed in Children into the three element list [Type,Ptr,GrandChildren]; it checks to make sure that the first child is the Nth child of the node pointed to by ParentPtr. Match/3 recursively invokes itself to check the form of the GrandChildren: match(1,GrandChildren,Ptr); and then it recursively invokes itself to check the rest of the Children: match(Next,RestChildren,-ParentPtr), where Next is N+1 and Children=[-[Type,Ptr,GrandChildren]|RestChildren].

If match/3 fails at any point, match/1 is backtracked to and selects another node in the database to try using the node—type(Type,Ptr) query. In this way, all of the nodes in the database (which were produced by the predicate parse/1) are searched until either the pattern described in the argument of match/1 is found, or it is determined that the pattern does not exist in the current abstract syntax tree.

The code for the predicate match/1 which implements the above described recursive routine is found in the Prolog predicate file ENGINE.ARI, which is listed in the Source Code Appendix hereto.

Node Relation Predicates

In addition to the match/1 predicate, the knowledge base 120 implements the following set of fourteen predicates which define various relations between nodes (these predicates are a subset of the predicates listed in the Predicates Definition section):

TABLE D

| Node Relation Predicates | |
|---|---|
| above/2 | proper above/2 |
| ancestor/2 | proper—ancestor/2 |
| below/2 | proper—below/2 |
| descendant/2 | proper—descendant/2 |
| left—sibling/2 | proper—left—sibling/2 |
| right—sibling/2 | proper—right—sibling/2 |
| next—left—sibling/2 | parent—child/2 |

Both arguments to each of the relation predicates refer to node pointers. All of the relations can be used with both arguments instantiated, or with the first argument as a variable and the second argument instantiated to an existing node pointer. It is not possible, however, to use the relation predicates with the first argument instantiated and the second argument as a variable; the results will not necessarily be correct if used in this fashion.

For example, referring to the abstract syntax tree generated for the program TEST.PAS, it can be determined that "block" (node21) is a proper—descendant of "program" (node22):

?—proper—descendant(PD,[node22,2,9])
PD=[node21,4,9]

All of the relation predicates are fully explained in the Predicate Definitions section.

The predicates proper—above/2, above/2, proper—below/2, and below/2 are all less specific than the predicates such as parent—child/2, ancestor/2, left—sibling/2, and the like. This is true, because, for example, if parent—child (A,B) is true, it necessarily follows that proper—above(A,B) is true; that is, parent—child (A,B) implies proper—above(A,B). Note that below/2 and above/2 are the least specific of all the relation predicates.

Generation of an efficient knowledge base mandates that the most specific predicates be used, so that the knowledge base pattern will match only to the portions of the abstract syntax tree intended to be matched. Table E below defines a partial order for all fourteen relation predicates. The partial order is Q→R, which is read as "Q implies R." The preferred embodiment utilizes an example compiler 300, which is an off-line software tool which will check the code in a knowledge base against the partial order defined in Table E.

In particular, it has been observed that the predicates above/2 and below/2 may function in a redundant fashion. A combination of the predicates left-sibling/2 and/or ancestor/2 is more efficient than the use of above/2, and likewise, a combination of the predicates right—sibling/2 and/or descendent/2 is more efficient than the use of below/2. Thus, in the preferred embodiment, the use of above/2 and below/2 has been avoided. The descriptions of above/2 and below/2 are included in this specification however, in order to present a complete description of predicates available in the present invention.

TABLE E

| Partial Order Over the Relation Predicates | |
|---|---|
| ancestor(X,Y) | → descendent(Y,X) |
| descendent(X,Y) | → ancestor(Y,X) |
| ancestor(X,Y) | → above(X,Y) |
| descendent(X,Y) | → below(X,Y) |
| proper—ancestor(X,Y) | → ancestor(X,Y) |
| proper—descendent(X,Y) | → descendent(X,Y) |
| proper—ancestor(X,Y) | → proper—descendent(Y,X) |
| proper—descendent(X,Y) | → proper—ancestor(Y,X) |
| parent—child(X,Y) | → proper—ancestor(X,Y) |
| parent—child(X,Y) | → proper—descendent(Y,X) |
| left—sibling(X,Y) | → right—sibling(Y,X) |
| right—sibling(X,Y) | → left—sibling(Y,X) |
| left—sibling(X,Y) | → above(X,Y) |
| right—sibling(X,Y) | → below(X,Y) |
| proper—left—sibling(X,Y) | → left—sibling(X,Y) |
| proper—right—sibling(X,Y) | → right—sibling(X,Y) |
| proper—left—sibling(X,Y) | → proper—right—sibling(Y,X) |
| proper—right—sibling(X,Y) | → proper—left—sibling(Y,X) |
| next—left—sibling(X,Y) | → proper—left—sibling(X,Y) |
| next—left—sibling(X,Y) | → proper—right—sibling(Y,X) |
| above(X,Y) | → below(Y,X) |
| below(X,Y) | → above(Y,X) |
| proper—above(X,Y) | → above(X,Y) |
| proper—below(X,Y) | → below(X,Y) |
| proper—above(X,Y) | → proper—below(Y,X) |
| proper—below(X,Y) | → proper—above(Y,X) |
| proper—descendent(X,Y) | → proper—below(X,Y) |
| proper—right—sibling(X,Y) | → proper—below(X,Y) |
| proper—ancestor(X,Y) | → proper—above(X,Y) |
| proper—left—sibling(X,Y) | → proper—above(X,Y) |

To describe how a knowledge base pattern predicate 122 is derived from match instructions and ordering relation predicates, reference is made to the Rotate programming problem, as shown in Table B above.

As indicated in the sample knowledge base outline above, one important program step which should be included in a student's solution code is the step of retrieving the former value of S[N] from the temporary variable and installing it in S[1], which appears in the solution above as S[1]:=Temp.

The knowledge base pattern predicate retrieve—from—temp—below—loop/6 shown below is constructed to find in the student's solution program a statement in the form A[N] :=Temp, as required above.

In the preferred embodiment, retrieve_from_temp_below_loop/6 is part of a knowledge base called ROTATE.ARI used to analyze a student's program solution to the Rotate problem.

The predicate retrieve_from_temp_below_loop/6 defines the correct form sought as well as two incorrect forms which may be found instead. Each of the two incorrect forms is annotated with a message. If an incorrect form is matched to the student's program, the message attached is reported to the student.

```
retrieve_from_temp_below_loop/6:
% The first clause defines what the knowledge base expects to
% find if the Pascal program is correct.
retrieve_from_temp_below_loop(
    RetrievePtr,
    ArrayName,
    Integrer,
    TempName,
    LoopPtr,
    Msgs) :-
match(
    [:=, RetrievePtr,
        [[variable,_,
            [[ArrayName,_, []],
                var_modifier_list,_,
                    [[array_index,_,
                        [[Integer,_,[]]]]]]],
        [variable,_,
            [[TempName,_,[]],
                [empty,_, []]]]]),
below(
    RetrievePtr,
    LoopPtr).
% The second clause defines what the knowledge base might find
% if the Pascal program contains the expected assignment
% statement in an unexpected place in the program.
retrieve_from_temp_below_loop(
    RetrievePtr,
    ArrayName,
    Integer,
    TempName,
    LoopPtr,
    Msgs) :-
match(
    [:=,RetrievePtr,
        [[variable,_,
            [[ArrayName,_,[]],
                [var_modifier_list,_,
                    [[array_index,_,
                        [[Integer,_,[]]]]]]],
        [variable,_,
            [[TempName,_,[]],
                [empty,_,[]]]]]),
not below(           %%% This call to below/2
    RetrievePtr,     %%% is not necessary, but
    LoopPtr),        %%% allows a declarative
messages(            %%% reading of the predicate.
    [[bug,RetrievePtr,[-1.0],
        ["The assignment statement", nl,
         "must be below the loop"]]],
    Msgs).
% The third clause covers the case where the Pascal program
% does not contain an assignment statement of the expected
form.
retrieve_from_temp_below_loop(
    RetrievePtr,
    ArrayName,
    Integer,
    TempName,
    LoopPtr,
    Msgs) :-
messages(
    [[bug,LoopPtr,[-1.0],
        ["Your program appears to be missing", nl,
         "a necessary assignment statement below",
         "the loop.",nl,
         "Specifically, it is missing an assignment", nl,
         "statement of the form", nl,
         ArrayName,"[",Integer,"]," := ",TempName]]],
    Msgs).
```

The match instructions in retrieve_from_temp_below_loop_6 specify the form of the assignment statement expected. The relations used are below(RetrievePtr,LoopPtr) and not(below(RetrievePtr,LoopPtr)) definitive, respectively, of the correct and possible incorrect positionings of the assignment statement.

If the match/1 predicate and the relation predicate below/2 of the first clause of retrieve_from_temp_below_loop_6 are both satisfied, the student's use of the assignment statement is correct, and no messages are flagged for display. This will occur when the RetrievePtr node is correctly "below" the LoopPtr node.

If, however, the match/1 predicate is satisfied but the RetrievePtr node is incorrectly "not below" the LoopPtr node, the messages variable will be instantiated to indicate that the assignment statement must be below the loop, as illustrated in the second clause of retrieve_from_temp_below_loop_6.

Finally, if the assignment statement is omitted such that the predicate match/1 is not satisfied, the messages variable will be automatically instantiated to so indicate, as shown in the third clause of retrieve_from_temp_below_loop_6.

As illustrated above, a knowledge base pattern predicate may take the form of any arbitrary Prolog predicate, and often includes calls to other predicates. It is preferable to list match instructions before any relation predicates. As shown in the example, retrieve_from_temp_below_loop_6 is written with the assumption that LoopPtr will be instantiated elsewhere and then passed in, in order to be compared against RetrievePtr after RetrievePtr has been found with the match instruction shown Messages The messages/2 instructions contain the text of error messages that can be output to the student. Normally, a message contains a pointer to a portion of the student's program and some text describing what is wrong with the student's program. In addition to the text, messages/2 also contain a negative integer, or weight. The analytic component 112 uses the sum of the weights of the matched patterns to calculate an overall score for a student's program, which is comparable to the score that the student would get if the program were graded manually, in accordance with APCS guidelines.

There are two types of messages in the preferred embodiment: "bug" and "method". Bug-type messages correspond to faulty student programs, while method-type messages correspond to correct student implementations. Only those messages labelled as bug-type messages are provided to the student in the preferred embodiment. It is useful, however, when generating knowledge base pattern predicates, to include method-type messages, in the event that users desire an embodiment which will provide messages that the solution entered by the student is correct in various respects. The preferred embodiment could easily be modified to output such method-type messages to the student if the messages are already contained within the knowledge bases in existence.

The messages that are associated with knowledge base pattern predicates have a very specific syntax, as defined in the Data Type Definition section. Each message has four fields: a type (bug or method), a node pointer (or a "*" as a place holder), a list containing a negative integer (or a "*"), and a list of message strings. Occurrences of "nl"in the list of strings causes a new line to be inserted in the message when it is displayed to the student. The third field of a list containing a number is used to weight the knowledge base pattern predicate for scoring purposes.

An example of a message was given in the third clause of the definition of the knowledge base pattern predicate retrieve_from_temp_below_loop/6. The predicate messages/2 takes as a first argument a list of messages. Messages/2 appends all of the messages that appear in its first argument and puts the result in its second argument. By convention, the second argument to messages/2 is usually the last parameter of the knowledge base pattern predicate. Messages are instantiated in the knowledge base pattern predicates and then passed "upwards" to the calling predicate and are then, ultimately, output to the student by the predicate top_level/1.

Scoring

In addition to producing English language messages on a student Pascal program, the preferred embodiment also generates an overall score representative of the score that the student would likely receive from an APCS grader if the solution program was submitted as an exam problem solution.

The weight attached to the second and third clauses of the knowledge base pattern predicate retrieve_from_temp_below_loop/6 is −1.0. The weights are passed, along with the messages, "upwards" to the predicate top_level/1 of the knowledge base. There, they are added together and the sum is reported to the student as the score for the solution program. If the sum is less than zero a score of zero, is reported. (Zero is the minimum score because zero is the minimum score for open response questions on the APCS examination.)

The magnitudes of the weights attached to the messages are derived from scoring rubrics for the APCS examination which have been made publicly available.

In sum, the structure of a knowledge base is as follows:

| | |
|---|---|
| knowledge base | = set of correct and incorrect knowledge base pattern predicates |
| knowledge base pattern predicate | = pattern to find + message |
| pattern to find | = matches to abstract syntax tree + relations between parts of tree |
| message | = text + weight |

A new knowledge base must be constructed for each new programming problem class added to the system's repertoire. For example, in the preferred embodiment, COMPACT.ARI and ROTATE.ARI are the two knowledge bases built to analyze student solutions to the problems of compacting and rotating an array, respectively.

By using appropriate match instructions, along with the generic Prolog variable and "_" appropriate node relation predicates, knowledge base pattern predicates can be created to be as flexible or specific as desired.

For example, if a knowledge base engineer wishes to specify that a certain node X can be anywhere above a certain node y, the knowledge base pattern predicate utilized to check for this will be quite flexible. That is, a successful match would occur against the abstract syntax tree as long as the general condition that X is above Y is met, no matter how many lines of code separate the two nodes.

If, however, the knowledge base engineer feels it is necessary to successfully match only if node X is directly above node Y, the knowledge base pattern predicate will be created to only match if this more specific condition occurs.

Thus, the knowledge base is created with an eye towards matching portions of the abstract syntax tree as flexibly or specifically as desired with nodes of the abstract syntax tree being considered matched if they are within a certain predetermined range, thus nodes can be matched as close or remote as desired by the knowledge base engineer.

Example Compiler

Figure 3:
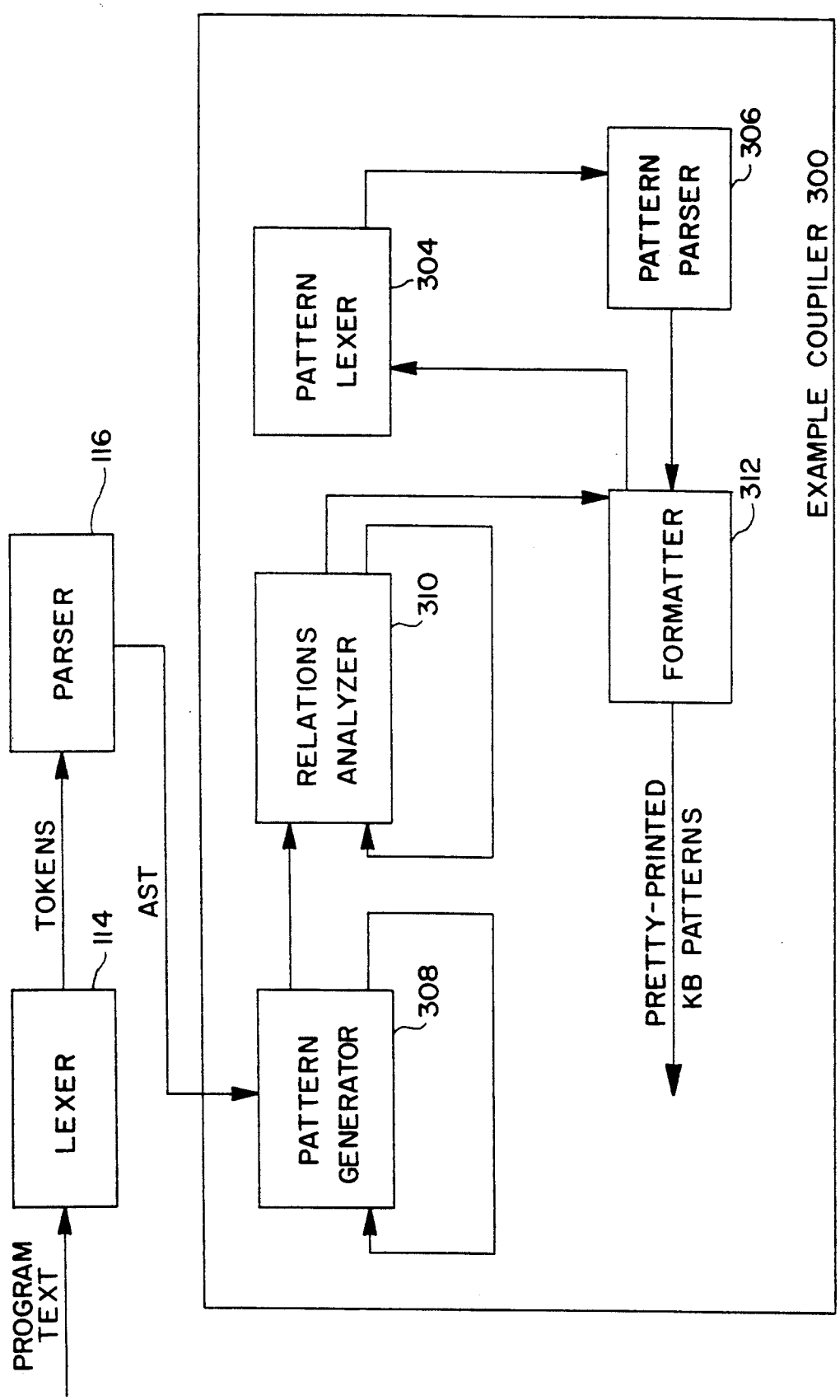
FIG. 3 is a block diagram of the example compiler of the preferred embodiment.

The knowledge base pattern predicates which comprise the knowledge base can be generated manually as described above. This process is partially automated in the preferred embodiment by an off-line utility, called an example compiler 300, which is shown at FIG. 3.

The example compiler 300 will take as input a model solution program in text form, and, through interaction with the knowledge engineer, will generate the knowledge base pattern predicates which comprise the knowledge base 120 for the programming problem in question. The example compiler 300 is described with reference to the Rotate problem, as shown in Table B, and a correct sample solution program, as shown in Table F. In particular, the function of the example compiler 300 will be illustrated by generating a knowledge base pattern predicate which will be used to check that the "retrieve from temporary variable" step is properly implemented in the solution program in Table F.

TABLE F
Correct Sample Solution to the Rotate Problem

```
PROGRAM Foo (INPUT, OUTPUT);
CONST Max = 100;
TYPE Item = INTEGER;
    List = ARRAY[1..Max] OF Item;
VAR PassedAsS : List;
    PassedAsN : INTEGER;
PROCEDURE Rotate (VAR S : List; N : INTEGER);
    VAR Temp : Item;
        I : 1..Max;
    BEGIN
        Temp := S[N];
        FOR I := N DOWNTO 2 DO BEGIN
            S[I] := S[I - 1]
        END;
        S[1] := Temp
    END;
BEGIN
    Rotate(PassedAsS, PassedAsN)
END.
```

Knowledge Engineer Use of the Example Compiler

Figure 5A:
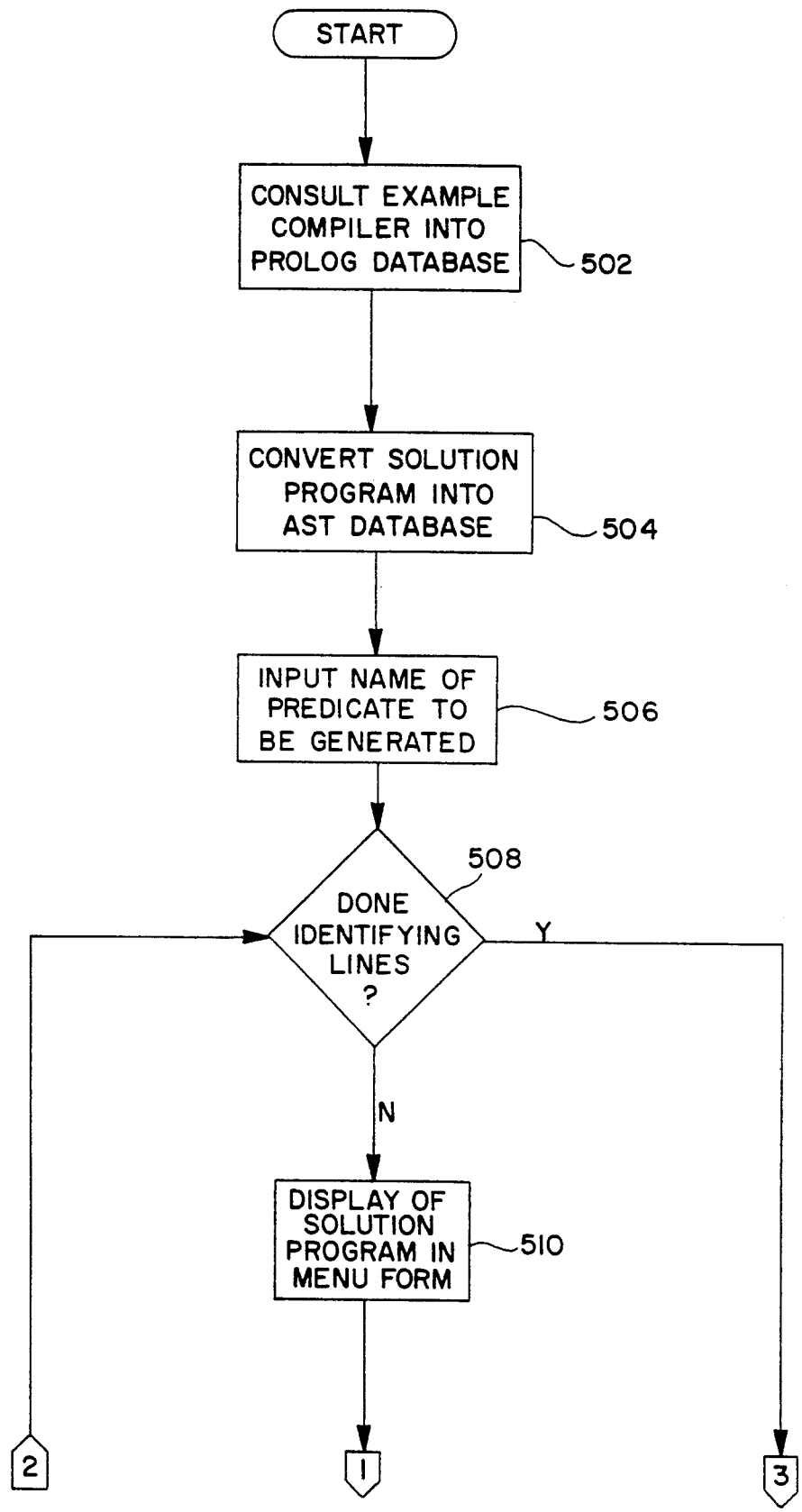
FIG. 5 is a flowchart showing how a knowledge engineer will use the example compiler.
Figure 5B:
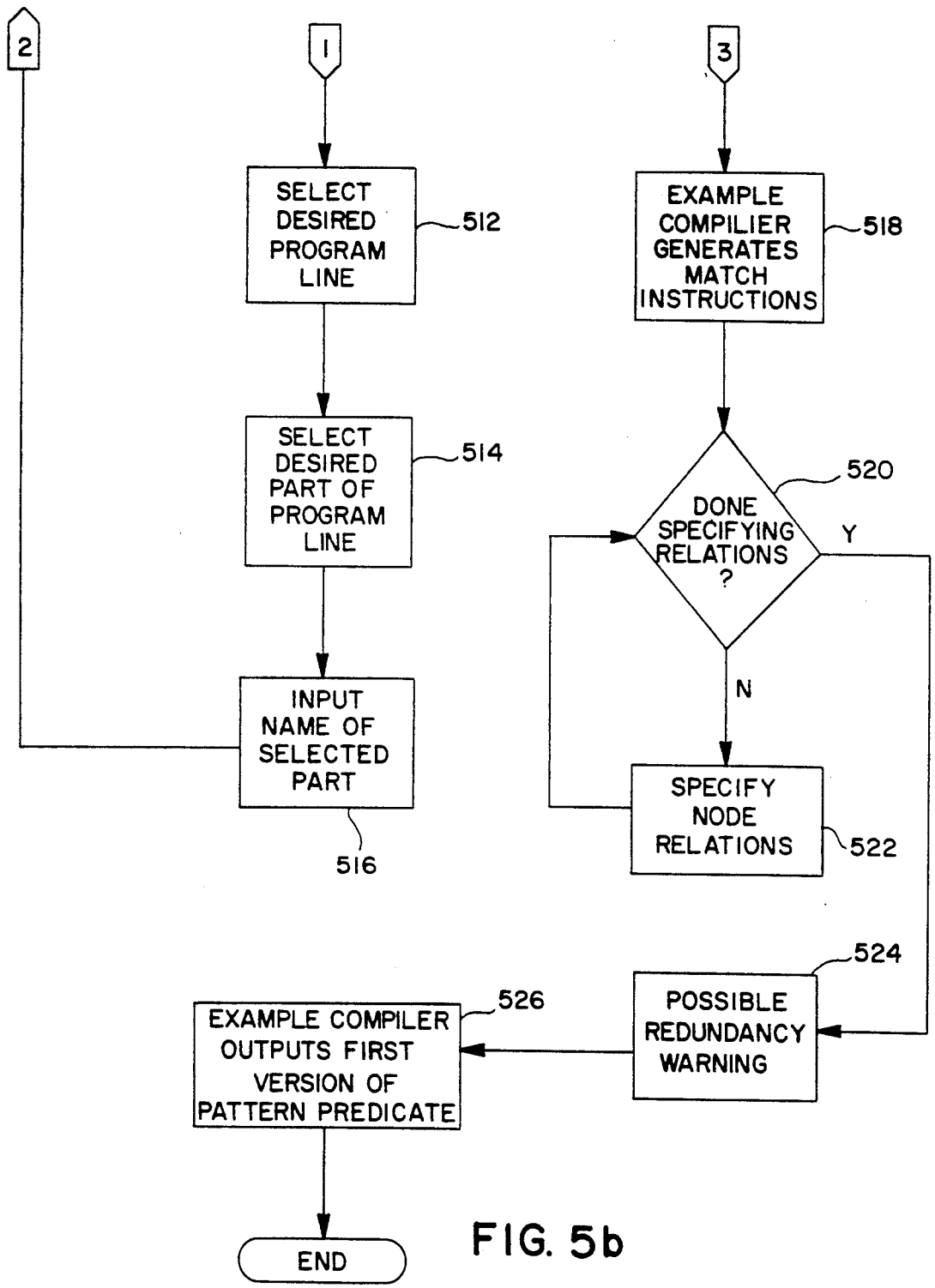

Referring to FIGS. 5(a) and 5(b), the knowledge engineer will use the example compiler 300 in the following manner. The knowledge engineer first consults the example compiler 300 into the Prolog database, as shown at block 502. The Pascal solution program, as shown in Table F, is then converted into an abstract syntax tree as shown at block 504 by the same lexer and parser used in the analytic component; that is, the lexer 114 and the parser 116, which are carried out by LEXER.ARI and PARSER.ARI, respectively.

The example compiler 300 will request a name for the knowledge base pattern predicate to be generated, which the knowledge engineer inputs as shown at block 506. In this example, the name retrieve_from_temp_below_loop is entered in response.

The knowledge engineer can indicate that he or she is done identifying lines in the solution program, as shown at block 508. If the knowledge engineer is not done, the example compiler will branch to display the solution in menu form as shown at block 510.

The knowledge engineer will be requested to select a desired line of code from the solution program at block 512 and a desired part of the selected line at block 514. In the present example, the ":=" symbol which is contained in the assignment statement below the FOR loop of ROTATE.PAS is selected.

The example compiler 300 will request a name for the selected part, which the knowledge engineer inputs as shown at block 516. In this example, the name RetrievePtr is entered for the ":=" symbol.

The line and part selection and part naming processes (blocks 508, 510, 512, 514 and 516) are repeatedly invoked until all the desired parts are selected and named. In this example, the part "FOR" is selected and named LoopPtr, and the loop is exited by responding affirmatively to the query at block 508.

The example compiler 300 will then process the information input by the knowledge engineer and automatically generate the appropriate match instructions. The next set of steps involve the definition of node relation predicates which will be included in the desired knowledge base pattern predicate.

At block 520, the example compiler 300 will query whether the knowledge engineer is done specifying relations involving the parts previously chosen, which in this example are RetrievePtr and LoopPtr. In response to a negative answer, the example compiler 300 will display a menu which lists all the possible node relation predicates available (see Table D). The knowledge base engineer then selects the desired node relation predicates at block 522 which describe the relation between the parts previously chosen.

In the present example, the predicate below(RetrievePtr,LoopPtr) is chosen at block 522. When done specifying relations between RetrievePtr and LoopPtr, the knowledge engineer is then given the option of specifying relations between LoopPtr and RetrievePtr. In our example, no further node relation predicates are chosen, and the example compiler 300 exits from block 520.

The example compiler will display a warning message, as shown at block 524, if it detects that the knowledge engineer has input redundant node relation predicates one of the node relation predicates will be deleted in order to eliminate the redundancy. For example, had the knowledge engineer entered the node relation predicate above(LoopPtr,RetrievePtr), it would be deleted since the predicate below(RetrievePtr,LoopPtr) implies above(LoopPtr,RetrievePtr), which had been previously entered.

Finally, the example compiler 300 outputs a first version of the knowledge base pattern predicate, as shown at block 526. The retrieve_from_temp_below_loop pattern predicate generated by the example compiler 300 in the present example is shown below:

```
retrieve_from_temp_below_loop(
    Retrieve_Ptr,
    Loop_Ptr) :-
match(
 [:=,Retrieve_Ptr,
 [[variable,_,
  [[s,_,
   []],
  [var_modifier_list,_,
   [[array_index,_,
    [[1,_,
     []]]]]]],
  [variable,_,
  [[temp,_,
   []],
  [empty,_,
   []]]]]),
match(
 [for,Loop_Ptr,
 [[for_assign,_,
  [[i,_,
   []],
  [2,_,
   []],
  [to,_,
   []],
  [variable,_,
  [[n,_,
   []],
  [empty,_,
   []]]]],
  [begin,_,
  [[:=,_,
   [[variable,_,
    [[i,_,
     []],
    [empty,_,
     []]]],
    [1,_,
     []]]],
   [:=,_,
   [[variable,_,
    [[s,_,
     []],
    [var_modifier_list,_,
     [[array_index,_,
      [[variable,_,
       [[i,_,
        []],
       [empty,_,
        []]]]]]]]],
    [variable,_,
    [[s,_,
     []],
    [var_modifier_list,_,
     [[array_index,_,
      [[-,_,
       [[variable,_,
        [[i,_,
         []],
        [empty,_,
         []]]],
        [1,_,
         []]]]]]]]]]]]),
below(
    Retrieve_Ptr,
    Loop_Ptr).
% End of retrieve_from_temp_below_loop
```

The knowledge base pattern predicate produced in this example by the example compiler 300 contains only two arguments, RetrievePtr and LoopPtr. In addition, the predicate is quite lengthy, due to the fact that it is very specific. The knowledge engineer has the option of manually reducing the size of the predicate by generalizing certain of its parts and adding variables to the argument. The final version of the knowledge base pattern predicate should thus be the same as or similar to the one generated entirely manually, which is retrieve_from_temp_below_loop/6.

The FOR loop in the generated predicate specifies a FOR loop containing two specific assignment statements rather than just a FOR loop. The first step in reducing the predicate retrieve_from_temp_below_loop/2 is to generalize the node pattern for the loop. The following node pattern accomplishes this objective:

```
[for,Loop_Ptr,
    [[for_assign,_,
        [[LoopVarName,_,
        []],
        StartExpr,
        [Direction,_,
        []],
        EndExpr]],
    _]]
```

The above node pattern is reduced-in size and has additional variables. If the node pattern above is unified with the one generated by the example compiler 300, the following bindings would result:

```
LoopVarName = i
StartExpr = [2,_,
            []]
Direction = to
EndExpr = [variable,_,
          [[n,_,
          []],
          [empty,_,
          []]]]
```

Variablizing parts of the node pattern makes the match instruction much more flexible. Furthermore, the newly variablized match instructions can be isolated in a separate predicate as follows:

```
for_loop(Loop_Ptr,LoopVarName,StartExpr,Direction,EndExpr)
:-
    match([for,Loop_Ptr,
        [[for_assign,_,
            [[LoopVarName,_,
            []],
            StartExpr,
            [Direction,_,
            []],
            EndExpr]],
        _]]).
```

By isolating out the FOR loop, a knowledge base pattern predicate that can be used in other knowledge bases where a FOR loop needs to be matched has been created. Having separated out the for_loop/5 predicate from the retrieve_from_temp_below_loop/2 predicate, the pattern can be rewritten as it appears below. Note that parts of the node pattern specifying the form of the assignment statement have been variablized and the variables added to the list of the predicate's arguments.

```
retrieve_from_temp_below_loop(
    Retrieve_Ptr,
    Loop_Ptr,
    ArrayName,
    ArrayIndex,
    TempVarName) :-
    match([:=,Retrieve_Ptr,
```

```
        [[variable,_,
            [[ArrayName,_,
            []],
            [var_modifier_list,_,
                [[array_index,_,
                    [[ArrayIndex,_,
                    []]]]]],
            [variable,_,
                [[TempVarName,_,
                []],
                [empty,_,
                []]]]]),
    for_loop(Loop_Ptr,
        LoopVarName,
        [2,_,[]],
        to,
        [variable,_,
            [[n,_,
            []],
            [empty,_,
            []]]]),
    below(Retrieve_Ptr,Loop_Ptr).
```

The resulting knowledge base pattern predicate retrieve_from_temp_below_loop/5 is closer in form to the first clause of the predicate retrieve_from_temp_below loop/6 which was generated completely manually. The only difference between the two is that retrieve_from_temp_below_loop/6 was generated with the assumption that the Loop_Ptr would be matched elsewhere and then passed into the predicate to be checked against the position of the Retrieve_Ptr.

A further comparison of the predicate retrieve_from_temp_below_loop/5 generated with the aid of the example compiler 300 with retrieve_from_temp_below_loop/6 reveals two deficiencies in retrieve_from_temp_below_loop/5. First, no accommodation has been made for Pascal programs which will not match the node patterns specified. Second, the loop is assumed to be a FOR, when, in practice, the program might use a different form of iteration (REPEAT loop, WHILE loop, tail recursion, etc.).

To remedy the first deficiency, we can add clauses to the definition of retrieve_from_temp_below_loop/5. By referring to retrieve_from_temp_below_loop/6, two more clauses are appropriate to add. One clause should handle the case where the assignment statement can still be matched, but where it is not necessarily below the LoopPtr as desired; a second clause can be added to cover the case where no assignment statement of the expected form could be found in the Pascal program analyzed. Bug-type messages, to be reported to the student, should be attached to both of these two extra clauses.

The match/1 instructions of any knowledge base pattern predicate can be replaced by a set of node_type/2, parent_child/2 and next_left_sibling/2 goals. This may be desirable if the argument, which must always be a nested list, is nested too deeply to be easily readable by the knowledge engineer, or for some other aesthetic reasons.

To illustrate, the match/1 instruction for the Pascal statement I:=1 is as follows:

```
match([:=,AssignPtr,
    [[variable,VarPtr,
        [[i,SymbPtr,
        []],
        [empty,EmptyPtr,
        []]]]).
```

-continued

```
[1,IntPtr,
[]]]).
```

This is equivalent to the following set of goals:
node_type(:=, AssignPtr),
parent_child(AssignPtr,VarPtr),
parent_child(AssignPtr,IntPtr),
next_left_sibling(VarPtr,IntPtr),
node_type(variable,VarPtr),
node_type(1,IntPtr),
parent_child(VarPtr,SymbPtr),
parent_child(VarPtr,EmptyPtr),
next_left_sibling(SymbPtr,EmptyPtr),
node_type(i,SymbPtr),
node_type(empty,EmptyPtr).

To satisfy the previously discussed objective of using the most specific relations in order to facilitate the most efficient matching of patterns, the example compiler 300 utilizes the implicative relations defined in Table E above. In the present example, the predicate right_sibling/2 is more specific than the predicate below/2, and thus is a more efficient predicate to use.

System Architecture of the Example Compiler

The architecture of the example compiler 300 is described with reference to FIG. 3. The example compiler 300 is comprised of a pattern lexer 304, a pattern parser 306, a pattern generator 308, a relations analyzer 310, and a formatter 312.

The functions of the example compiler 300 are carried out by five files of Prolog predicates,—EC.P, LEX_PATTERN.P, PARSE_PATTERN.P, PP_PATTERN.P, and NODE2PATTERN.P—all of which are listed in the Source Code Appendix hereto. EC.P is a top-level Prolog file that consults the remaining four files into the Prolog database.

The lexer 114 accepts the program in text form from the computer/user interface 102 and outputs a list of tokens to the parser 116. The parser 116 processes the tokens from the lexer 114 and generates an abstract syntax tree, which is a node representative of the program entered by the knowledge engineer.

The pattern generator 308, which function is carried out by the Prolog file NODE2PATTERN.P, converts the abstract syntax tree produced by the parser 116 to a pattern which is displayed, in menu form, to the user for further modification as explained above.

The relations analyzer 310 provides the interactive function of allowing the knowledge base engineer to specify the particular node relations predicates which are to be included in the final version of the knowledge base pattern predicate being created. Finally, the pattern lexer 304, the pattern parser 306, and the formatter 312, the functions of which are carried out by the Prolog files LEX_PATTERN.P, PARSE_PATTERN.P, and PP_PATTERN.P, respectively, act as a pretty printer for the Prolog predicate which formats the predicate so that the knowledge engineer can be optionally presented with an intelligible representation thereof.

PREDICATE DEFINITIONS

The following section describes the significant predicates defined in the analytic component. Predicates are listed alphabetically.

a_very_large_number/1
above/2
analyze/1
ancestor/2
below/2
descendent/2
left_sibling/2
match/1
messages/2
next_left_sibling/2
node_type/2
nth_child/3
open_file_and_lex_tokens/2
output_file_for_messages/1
output_messages/2
parent_child/2
parse/1
prefix_to_infix/2
proper_above/2
proper_ancestor/2
proper_below/2
proper_descendent/2
proper_left_sibling/2
proper_right_sibling/2 recreate_node/2
right_sibling/2
root_node/1
top_level/1 a_very_large_number(?N)
_____

Defined in File: UTILS.ARI

Argument Description: The argument N is a variable or the integer 9999999. A_very_large_number(N) is used as a global constant and often as a placeholder in slots of a node pointer which require an integer.

Predicate Description: For each node created by the predicate parse/1, a unique node pointer is created of the form [ID,StartLine,EndLine] where StartLine and EndLine refer to the lines of text in the original Pascal program that describe the contents of the node. At times, the parser needs to create nodes that do not correspond to any text in the original Pascal program. For example, each IF node created by parse/1 must contain an ELSE node even if the Pascal program has no ELSE condition (i.e., the author of the Pascal program has written an IF-THEN construct instead of an IF-THEN-ELSE construct). In such a case, the parser will create a "placeholder" node and the pointer to this node will, necessarily, have non-significant integers in the StartLine and EndLine slots; these are filled with the value of N after a query of the form a_very_large_number(N). A "placeholder" node pointer will always look something like [nodexx,9999999,9999999]. The value 9999999 is also used in formatted messages to indicate "no place in particular" in the Pascal program. That is, general advice about a Pascal program would be formatted as follows:

@9999999 9999999
 General advice about the program, etc.
 !

Predicate Technical Description: a_very_large_number/1 is defined as follows in the file UTILS.ARI:

a_very_large_number(9999999).

above(?A,+B)
_____

Defined in File: ENGINE.ARI

Argument Descriptions: The argument A is a variable or a node pointer. The argument B is a node pointer. A and B point to nodes in an abstract syntax tree. A points to a node above the node pointed to by B.

Predicate Description: Above/2 is a reflexive relation;

i.e., above(X,X) will always succeed. A is above B if A = B, or if A is a descendent of S and S is a next_left_sibling B, or if A is above P and P is the parent of B. With fully instantiated arguments, above/2 can be used to check if a known node pointer can be described as above a second node pointer. If A is uninstantiated and B is instantiated, then the predicate will instantiate A to be a pointer to a node that is above the node pointed to by B. Upon backtracking, A will be instantiated to a node pointer that corresponds to another node above the node B points to.

Predicate Technical Description: If the two arguments to above/2 can be unified, then above/2 returns successfully. Otherwise, proper_above is called to determine the relationship between the two arguments.

analyze(+Files)
---

Defined in File: ANALYZER.ARI

Argument Description: The argument Files is a list of file names (either single-quoted atoms or strings). The files listed in the argument Files should contain the text of a Pascal program.

Predicate Description: A knowledge base must be consulted into the current Prolog database before the predicate analyze/1 can be executed. The predicate analyze/1 is used to apply any of the knowledge bases to the analysis of a given Pascal program contained in the File. The predicate output_file_for_messages(OutputFile) defines the name of file to which the results of the analysis are written.

Predicate Technical Description: All knowledge bases contain a definition for the predicate top_level/1. Analyze/1 accepts a file name (File), parses the File using the predicate parse/1, analyzes the resulting abstract syntax tree using the predicate top_level/1, and then outputs the results of the analysis using the predicate output_messages/2.

ancestor(?A,+D)
---

Defined in File: ENGINE.ARI

Argument Descriptions: The argument A is a variable or a node pointer. The argument D is a node pointer. A and D point to nodes in an abstract syntax tree. A points to an ancestor of the node pointed to by D.

Predicate Description: Ancestor/2 is a reflexive relation; i.e., ancestor(X,X) will always succeed. A is an ancestor of D if A = D, or if A is the parent of D, or if A is an ancestor of the parent of D. With fully instantiated arguments, ancestor/2 can be used to check if a known node pointer can be described as an ancestor of a second node pointer. If A is uninstantiated and D is instantiated, then the predicate will instantiate A to be a pointer to a node that is an ancestor of the node pointed to by D. Upon backtracking, A will be instantiated to a node pointer that corresponds to another of the ancestors of the node D points to.

Predicate Technical Description: If both arguments to ancestor/2 can be unified, ancestor/2 returns successfully. Otherwise, ancestor/2 calls the predicate proper_ancestor/2.

below(?B,+A)
---

Defined in File: ENGINE.ARI

Argument Descriptions: The argument B is a variable or a node pointer. The argument A is a node pointer. B and A point to nodes in an abstract syntax tree. B points to a node below the node pointed to by A.

Predicate Description: Below/2 is a reflexive relation; i.e., below(X,X) will always succeed. B is below A if B = A, or if B is a proper_descendent of A, or if B is a descendent of S which is a proper_right_sibling of A, or B is below S which is a proper_right_sibling of P which is the parent of A. With fully instantiated arguments, below/2 can be used to check if a known node pointer can be described as below a second node pointer. If B is uninstantiated and A is instantiated, then the predicate will instantiate B to be a pointer to a node that is below the node pointed to by A. Upon backtracking B will be instantiated to a node pointer that corresponds to another node below the node A points to.

Predicate Technical Description: If the two arguments to below/2 can be unified, then below/2 returns successfully. Otherwise, proper_below/2 is called to determine the relationship between the two arguments.

descendent(?D,+A)
---

Defined in File: ENGINE.ARI

Argument Descriptions: The argument D is a variable or a node pointer. The argument A is a node pointer. D and A point to nodes in an abstract syntax tree. D points to a descendent of the node pointed to by A.

Predicate Description: Descendent/2 is a reflexive relation; i.e., descendent(X,X) will always succeed. D is a descendent of A if D = A, or if D is the child of A, or if D is a descendent of a child of A. With fully instantiated arguments, descendent/2 can be used to check if a known node pointer can be described as a descendent of a second node pointer. If D is uninstantiated and A is instantiated, then the predicate will instantiate D to be a pointer to a node that is a descendent of the node pointed to by A. Upon backtracking, D will be instantiated to a node pointer that corresponds to another of the descendants of the node A points to.

Predicate Technical Description: If both arguments to descendent/2 can be unified, descendent/2 returns successfully. Otherwise, descendent/2 calls the predicate proper_descendent/2.

left_sibling(?L,+R)
___

Defined in File: ENGINE.ARI

Argument Descriptions: The argument L is a variable or a node pointer. The argument R is a node pointer. L and R point to nodes in an abstract syntax tree. L points to a left_sibling of the node pointed to by R.

relation; i.e., left_sibling(X,X) will always succeed. L is a left_sibling of R if L = R, or if L is the next_left_sibling of R, or if L is a left_sibling of the next_left_sibling of R. With fully instantiated arguments, left_sibling/2 can be used to check if a known node pointer can be described as a left_sibling of a second node pointer. If L is uninstantiated and R is instantiated, then the predicate will instantiate L to be a pointer to a node that is a left_sibling of the node pointed to by R. Upon backtracking, L will be instantiated to a node pointer that corresponds to another of the left_siblings of the node R points to.

Predicate Technical Description: If the two arguments to left_sibling/2 can be unified, then left_sibling/2 returns successfully. Otherwise, proper_left_sibling/2 is called to determine the relationship between the two arguments.

match(+Pattern)
___

Defined in File: ENGINE.ARI

Argument Descriptions: The argument Pattern is a node pattern.

Predicate Description: Match/1 searches an abstract syntax tree in order to find specific node types and node pointers within the tree. Match/1 binds variables contained within the argument Pattern to specific node types and node pointers.

Example: Assume that a Pascal program containing a FOR loop on line 17 has been successfully parsed. To find the node pointer to the FOR loop, the pointer to its first child (which a FOR_ASSIGN node), the pointers and types of two grandchildren of the FOR loop (i.e., the two children of the FOR_ASSIGN), and the node type and node pointer to the FOR loop's second child (i.e., the body of the FOR loop, which, in this case is a BEGIN), the following query is presented:

```
?-match([for,ForPtr,[[for_assign,ForAssignPtr,[LHS,RHS]],
        Body]]).
```

Then the following bindings for the variables in the argument to match are received:

```
ForPtr        =   [node110,17,20]
ForAssignPtr  =   [node81,17,17]
LHS           =   [i,[node74,17,17],[]]
RHS           =   [2,[node75,17,17],[]]
Body          =   [begin,[node109,17,20],[]] ->;
no
```

Note that match/1 fills in only the node types and node pointers in the variables present in the Pattern used as an argument to match/1. The third element of the list returned for, for example, Body is an empty list. If one wanted to see the node pointer and node type of, for example, the first child of the Body, one would pose a query of the following form:

```
?- match([begin,
          node109,17,20],[[NodeType,NodePtr,_]|_]]).
``` which would return:

```
NodeType = :=
NodePtr = [node87,18,18] ->;
no
```

Predicate Technical Description: By backtracking, match/1 functions such that all of the nodes in the database (i.e., all of the nodes produced by the predicate parse in parsing the Pascal program) are searched until either Pattern requested is found or it is determined that the Pattern does not exist in the current abstract syntax tree.

messages(+L,-Msgs)
___

Defined in File: ENGINE.ARI

Argument Descriptions: The argument L is a list of lists of messages. Msgs is a variable.

Predicate Description: The predicate messages/2 appends a list of lists of messages together to form a list of messages, which is put into the Msgs argument to the predicate. Messages of the form [ok] are filtered out of the result. Messages of the form [ok] are often used in knowledge base patterns as placeholders, and, thus, are not preserved.

Predicate Technical Description: Each element of L is examined in turn. Each element of L is a list of messages, and each of their elements are, in turn, examined one at a time. If the element is not discarded, then the element is included in the result Msgs. The predicate messages/2 terminates successfully when L = []. If the first element is a variable, then it is discarded; if it is a message of the form [bug|_], then it is kept; if it is a message of the form [method|_], then it is kept; if it is a message of the form [ok], then it is discarded.

next_left_sibling(?L,?R)
___

Defined in File: Next_left_sibling/2 assertions are not defined in any particular file, but are dynamically generated by the predicate parse/1.

Argument Descriptions: The argument L is a variable or a node pointer. The argument R is a variable or a node pointer. L and R point to nodes in an abstract syntax tree. L points to a node that is the next_left_sibling of the node pointed to by R.

Predicate Description: Next_left_sibling is not a reflexive relation; i.e., next_left_sibling(X,X) will never succeed. With fully instantiated arguments, next_left_sibling can be used to check if a known node pointer can be described as the next_left_sibling of a second node pointer. If L is uninstantiated, then the predicate will instantiate L to be a pointer to the node that is the next_left_sibling of the node pointed to by R. Any given node has one or zero next_left_siblings. If R is uninstantiated, then the predicate will instantiate R to be a pointer to the node that is, in the abstract syntax tree currently asserted in the Prolog database, immediately to the right of the node pointed to by L. Any given node has one or zero nodes to its immediate right in the abstract syntax tree. If both L and R are uninstantiated, then next_left_sibling(L,R) will return an example of a next_left_sibling pair that has asserted into the Prolog database by the predicate parse/1.

Predicate Technical Description: The predicate parse/1 asserts all instances of next_left_sibling/2 into the Prolog database after parsing a syntactically correct Pascal program.

node_type(?Type,?Ptr)
___

Defined in File: Node_type/2 assertions are not defined in any particular file, but are dynamically generated by the predicate parse/1.

Argument Descriptions: The argument Type is a variable or an atom. The argument Ptr is a variable or a node pointer. Ptr points to a node in an abstract syntax tree. Type is the node type of the node pointed to by Ptr.

Predicate Description: With fully instantiated arguments, node_type/2 can be used to check if a known node pointer points to a particular type of node. If Type is uninstantiated, then the predicate will instantiate Type to be the node type of the node pointed to by Ptr. Any given node has one, and only one, node type. If Ptr is uninstantiated, then the predicate will instantiate Ptr to be a pointer to a node that is of node type "Type". Any abstract syntax tree may have zero or more nodes of a given node type. If both Type and Ptr are uninstantiated, then node_type(Type,Ptr) will return an example of a node_type assertion asserted to the current Prolog database by the predicate parse/1.

Predicate Technical Description: The predicate parse/1 asserts all instances of node_type/2 into the Prolog database after parsing a syntactically correct Pascal program.

nth_child(+N,?NthChildPtr,+ParentPtr)

Defined in File: ENGINE.ARI

Argument Descriptions: The argument N is an integer. NthChildPtr is either a variable or a node pointer. ParentPtr is a node pointer. NthChildPtr and ParentPtr both refer to nodes in an abstract syntax tree. NthChildPtr points to the node that is the Nth child of the node pointed to by ParentPtr.

Predicate Description: Each node of an abstract syntax tree has zero or more children. The leftmost child is defined to be the first child. The children are ordered according to the predicate next_left_sibling. If one thinks of a node as a data structure, and a node's children as the slots in the data structure, then one can describe the predicate nth_child as a slot accessor function. Given that ParentPtr has been instantiated to a particular node pointer, we can say that NthChildPtr points to the first child of the node pointed to by ParentPtr if NthChildPtr is a child of ParentPtr and if there does not exist a node to the left of NthChildPtr, i.e., such that not next_left_sibling(S,NthChildPtr) is true. NthChildPtr points to the Nth child of the node pointed to by ParentPtr if NthChildPtr is a child of ParentPtr, if I is N - 1, IthChildPtr is the next_left_sibling of NthChildPtr, and IthChildPtr points to the Ith child of ParentPtr.

Predicate Technical Description: NthChildPtr points to the first child of the node pointed to by ParentPtr if ParentPtr is NthChildPtr's parent and if there does not exist a ZerothChildPtr such that next_left_sibling(ZerothChildPtr,NthChildPtr) is true. Otherwise, NthChildPtr points to the Nth child of the node pointed to by ParentPtr if ParentPtr is NthChildPtr's parent and I is N - 1 and IthChildPtr is the next_left_sibling of NthChildPtr and if IthChildPtr points to the Ith child of the node pointed to by ParentPtr.

open_file_and_lex_tokens(+File,-Tokens)

Defined in File: ENGINE.ARI

Argument Descriptions: The argument File is a file name (either a single-quoted atom or a string). The argument Tokens is a variable. After successful execution, Tokens contains a list of tokens produced by the lexer's pass through the text contained in the File. The text contained in the File will usually be a Pascal program. The lexer is a Pascal lexer.

Predicate Description: The predicate open_file_and_lex_tokens/2 opens a File (typically containing a Pascal program), executes the lexer on the text contained in the File, and then closes the File. The results of the lexer are put into the Tokens argument.

output_file_for_messages(?FileName).

Defined in File: ANALYZER.ARI

Argument Description: The argument FileName is a variable or the atom 'CRITIQUE.TXT'. The results of an analysis of a Pascal program is output into the file CRITIQUE.TXT.

Predicate Description: output_file_for_messages/1 identifies the name of the file to which the results of an analysis will be written.

Predicate Technical Description: output_file_for_messages/1 is defined as follows in the file ANALYZER.ARI:
 output_file_for_messages('critique.txt').

output_messages(+Messages,+Handle)

Defined in File: UTILS.ARI

Argument Descriptions: The argument Messages is a list of messages. The argument Handle is the identifier for an output stream (see the Arity Prolog Version 5.1 programming manual for the predicate open/2 for more information). Messages are output to the file pointed to by Handle.

Predicate Description: Output_messages/2 is the predicate used by analyze/1 to record the results of the analysis into a file. Messages is usually instantiated by the predicate top_level/1. Handle is usually instantiated by the predicate analyze_aux. Given a list of messages and a handle to an output stream, output_messages will write the Messages as formatted messages into the file pointed to by Handle. Normally, the file pointed to by Handle is the File of output_file_for_messages(File). Only messages of the form [bug,_,_] are output. The messages of the form [method,_,_] are filtered out.

Predicate Technical Description: Output_messages/2 accepts a list of messages and a handle to an output stream. It filters out all messages of the form [method,_,_]. The remaining messages are output as formatted messages into the file pointed to by the given handle.

parent_child(?P,?C)

Defined in File: Parent_child/2 assertions are not defined in any particular file, but are dynamically generated by the predicate parse/1.

Argument Descriptions: The argument P is a variable or a node pointer. The argument C is a variable or a node pointer. P and C point to nodes in an abstract syntax tree. P points to a node that is the parent of the node pointed to by C.

Predicate Description: Parent_child/2 is not a reflexive relation; i.e., parent_child(X,X) will never succeed. With fully instantiated arguments, parent_child/2 can be used to check if a known node pointer can be described as the parent of a second node pointer. If P is uninstantiated, then the predicate will instantiate P to be a pointer to the node that is the parent of the node pointed to by C. Any given node has one, and only one, parent. If C is uninstantiated, then the predicate will instantiate C to be a pointer to the node that is a child of the node pointed to by P. A node can have zero or more children. If both P and C are uninstantiated, then parent_child(P,C) will return an example of a parent child pair that has been asserted into the Prolog database by the predicate parse/1.

Predicate Technical Description: The predicate parse/1 asserts all instances of parent_child/2 into the Prolog database after parsing a syntactically correct Pascal program.

parse(+File)

Defined in File: PARSER.ARI

Argument Description: The argument File is a file name (either a single-quoted atom or a string). File is the name of the file containing a Pascal program to be parsed.

Predicate Description: Given the name of a file containing a syntactically correct Pascal program, parse creates an abstract syntax tree for the program by adding four kinds of assertions into the current Prolog database: parent_child/2, next_left_sibling/2, node_type/2, and root_node/1. The topology of an abstract syntax tree is defined by the set of all parent_child/2, next_left_sibling/2, node_type/2 and root_node/1 assertions that exist in the current database. The predicate parse adds only one root_node(RootPtr) assertion to the database for each Pascal program parsed; RootPtr is the node pointer that points to the root node of the abstract syntax tree. The node type of any root node will always be the atom 'program'. The parent_child(P,C) assertions define a parent-child, partial ordering on the nodes in the abstract syntax tree. The next_left_sibling(L,R) assertions define a left-to-right, partial ordering on the nodes in the abstract syntax tree. The left-to-right ordering is a total ordering on sibling nodes in the abstract syntax tree. The node_type(Type,Ptr) assertions define the types of each node in the abstract syntax tree. Node types are always atoms and roughly correspond to the allowable constructs and data types defined in the Pascal language standard.

Predicate Technical Description: The predicate parse/1 calls open_file_and_lex_tokens/2, which opens the File and creates a list of tokens from the text in the File. Parse/1 then calls the predicate pascal_program(AST,Tokens,[]), which creates the abstract syntax tree in a nested list form. Finally, the predicate create_tree_relationships accepts the abstract syntax tree in nested list form and creates a set of parent_child/2, next_left_sibling/2, node_type/2 and root_node/1 assertions and adds them to the current Prolog database. (The predicate recreate_node is essentially a side-effect-free, inverse of the predicate create_tree_relationships.) The predicate pascal_program/3 is the top-level production of a parser written as definite clause grammar productions.

prefix_to_infix(+PrefixPtr,-InfixExpr)
___

Defined in File: PARSER.ARI

Argument Descriptions: The argument PrefixPtr is a pointer to a node. The argument InfixExpr is a string. The node type of the PrefixPtr must always be one of the following: variable, an integer (e.g., 6), a real (e.g., 1.1), or a binop defined over numbers (e.g., +, -, *, /, etc.). For example;
 ?- node_type(Type,PrefixPtr).
 Type = variable
 PrefixPtr = [node7,5,5] ->
would identify a suitable PrefixPtr. In general, PrefixPtr can point to one of a limited set of types of parsed arithmetic expressions created during the parsing of Pascal programs. InfixExpr is an infix representation of the arithmetic expression pointed to by PrefixPtr.

Predicate Description: Prefix_to_infix/2 translates the node pointed to by PrefixPtr and represented as a set of assertions in the Prolog database into an infix expression contained in a string.

Predicate Technical Description: Prefix_to_infix/2 accepts a pointer to a node and returns a string. The pointer can point to a node of any of the following types: variable, an integer, a real, or a binop defined over numbers. All of these types of nodes can be rendered by prefix_to_infix as infix expressions.

proper_above(?A,+B)

Defined in File: ENGINE.ARI

Argument Descriptions: The argument A is a variable or a node pointer. The argument B is a node pointer. A and B point to nodes in an abstract syntax tree. A points to a node properly above the node pointed to by B.

Predicate Description: proper_above is not a reflexive relation; i.e., proper_above(X,X) will never succeed. A is properly above B if A is a descendent of S and S is a next_left_sibling B, or if A is proper_above P and P is the parent of B. With fully instantiated arguments, proper_above/2 can be used to check if a known node pointer can be described as properly above a second node pointer. If A is uninstantiated and B is instantiated, then the predicate will instantiate A to be a pointer to a node that is properly above the node pointed to by B. Upon backtracking, A will be instantiated to a node pointer that corresponds to another node properly above the node B points to.

Predicate Technical Description: S, the proper_left_sibling of B, is fetched and A is checked to insure that A is a descendent of S. Otherwise, P, the parent of B, is fetched and A is checked to insure that A is above P.

proper_ancestor(?A,+D)

Defined in File: ENGINE.ARI

Argument Descriptions: The argument A is a variable or a node pointer. The argument D is a node pointer. A and D point to nodes in an abstract syntax tree. A points to a proper_ancestor of the node pointed to by D.

Predicate Description: Proper_ancestor/2 is not a reflexive relation; i.e., proper_ancestor(X,X) will never succeed. A is an proper_ancestor of D if A is the parent of D, or if A is an proper_ancestor of the parent of D. With fully instantiated arguments, proper_ancestor/2 can be used to check if a known node pointer can be described as a proper_ancestor of a second node pointer. If A is uninstantiated and D is instantiated, then the predicate will instantiate A to be a pointer to a node that is an proper_ancestor of the node pointed to by D. Upon backtracking, A will be instantiated to a node pointer that corresponds to another of the proper_ancestors of the node D points to.

Predicate Technical Description: If A is the parent of D, then proper_ancestor/2 returns successfully. Otherwise, the parent of D is fetched and proper_ancestor/2 is recursively invoked to see if A is a proper_ancestor of the parent of D.

proper_below(?B,+A)
___

Defined in File: ENGINE.ARI

Argument Descriptions: The argument B is a variable or a node pointer. The argument A is a node pointer. B and A point to nodes in an abstract syntax tree. B points to a node properly below the node pointed to by A.

Predicate Description: Proper_below/2 is not a reflexive relation; i.e., proper_below(X,X) will never succeed. B is properly below A if B is a proper_descendent of A, or if B is a descendent of S which is a proper_right_sibling of A, or if B is below S which is a proper_right_sibling of P which is the parent of A. With fully instantiated arguments, proper_below/2 can be used to check if a known node pointer can be described as properly below a second node pointer. If B is uninstantiated and A is instantiated, then the predicate will instantiate B to be a pointer to a node that is properly below the node pointed to by A. Upon backtracking, B will be instantiated to a node pointer that corresponds to another node properly below the node A points to.

Predicate Technical Description: If B is a proper_descendent of A, then proper_below/2 returns successfully. Otherwise, S, a proper_right_sibling of A, is fetched and B is checked to see if B is a descendent of S. Otherwise, P, A's parent, is fetched, then one of P's proper_right_siblings, S, is fetched, and then B is checked to see that B is below S.

proper_descendent(?D,+A)
___

Defined in File: ENGINE.ARI

Argument Descriptions: The argument D is a variable or a node pointer. The argument A is a node pointer. D and A point to nodes in an abstract syntax tree. D points to a proper_descendent of the node pointed to by A.

Predicate Description: Proper_descendent/2 is not a reflexive relation; i.e., proper_descendent(X,X) will never succeed. D is a proper_descendent of A if D is the child of A, or if D is a proper_descendent of a child of A. With fully instantiated arguments, proper_descendent/2 can be used to check if a known node pointer can be described as a proper_descendent of a second node pointer. If D is uninstantiated and A is instantiated, then the predicate
will instantiate D to be a pointer to a node that is a
proper_descendent of the node pointed to by A. Upon
backtracking, D will be instantiated to a node pointer that
corresponds to another of the proper_descendants of the
node A points to.

Predicate Technical Description: If D is a child of A,
then proper_descendent/2 returns successfully. Otherwise,
C, a child of A, is fetched and proper_descendent/2 is
called recursively to see if D is a proper_descendent of C.

proper_left_sibling(?L,+R)
_____

Defined in File: ENGINE.ARI

Argument Descriptions: The argument L is a variable or a
node pointer. The argument R is a node pointer. L and R
point to nodes in an abstract syntax tree. L points to a
proper_left_sibling of the node pointed to by R.

Predicate Description: Proper_left_sibling/2 is not a
reflexive relation; i.e., proper_left_sibling(X,X) will
never succeed. L is a proper_left_sibling of R if L is
the next_left_sibling of R, or if L is a left_sibling of
the next_left_sibling of R. With fully instantiated
arguments, proper_left_sibling/2 can be used to check if a
known node pointer can be described as a
proper_left_sibling of a second node pointer. If L is
uninstantiated and R is instantiated, then the predicate
will instantiate L to be a pointer to a node that is a
proper_left_sibling of the node pointed to by R. Upon
backtracking, L will be instantiated to a node pointer that
corresponds to another of the proper_left_siblings of the
node R points to.

Predicate Technical Description: If L is the
next_left_sibling of R, then proper_left_sibling/2 returns
successfully. Otherwise, S, R's next_left_sibling, is
fetched and proper_left_sibling/2 is recursively invoked to
determine if L is a proper_left_sibling of S.

proper_right_sibling(?R,+L)
_____

Defined in File: ENGINE.ARI

Argument Descriptions: The argument R is a variable or a
node pointer. The argument L is a node pointer. R and L
point to nodes in an abstract syntax tree. R points to a
proper_right_sibling of the node pointed to by L.

Predicate Description: Proper_right_sibling/2 is not a
reflexive relation; i.e., proper_right_sibling(X,X) will
never succeed. R is a proper_right_sibling of L if R's
next_left_sibling is L, or if R is a proper_right_sibling of S, whose next_left_sibling is L. With fully instantiated arguments, proper_right_sibling/2 can be used to check if a known node pointer can be described as a proper_right_sibling of a second node pointer. If R is uninstantiated and L is instantiated, then the predicate will instantiate R to be a pointer to a node that is a proper_right_sibling of the node pointed to by L. Upon backtracking, R will be instantiated to a node pointer that corresponds to another of the proper_right_siblings of the node L points to.

Predicate Technical Description: If L is the next_left_sibling of R, then proper_right_sibling/2 returns successfully. Otherwise, the pointer to the node immediately to the right of the node pointed to by L is fetched using next_left_sibling(L,S). Then, proper_right_sibling/2 is recursively invoked to determine if R is a proper_right_sibling of S.

recreate_node(+Ptr,-NodeAsList)
---

Defined in File: PARSER.ARI

Argument Descriptions: The argument Ptr is a node pointer. The argument NodeAsList is a variable. The predicate recreate_node/2 instantiates NodeAsList to be the nested list form of the node pointed to by Ptr.

Predicate Description: The abstract syntax tree produced by the predicate parse/1 is asserted into the Prolog database as a set of separate assertions. The predicate recreate_node/2 uses the existing assertions about the abstract syntax tree to create a nested list structure isomorphic to the assertions. Recreate_node/2 allows one to illustrate the form of the abstract syntax tree as one nested list rather than as a set of interrelated parent_child/2, next_left_sibling/2, node_type/2, and root_node/1 assertions.

Predicate Technical Description: Given Ptr, a pointer to a node, recreate_node/2 fetches its node type with node_type(Type,Ptr). It puts the Type in the head of the nested list output. Recreate_node/2 fetches the node pointers for each of Ptr's children, recursively recreates each of the children as a nested list, and then sorts the resulting nested lists in a left-to-right order using the next_left_sibling/2 assertions in the Prolog database. Ptr is inserted as the second element of NodeAsList. The sorted nested lists that represent the children are put in as the third element of the output list, NodeAsList. In general a node is represented as a nested list of the following form:

[<nodetype>,[<nodeid>,<integer>,<integer>],
    <nodes_as_lists>]

where the [<nodeid>,<integer>,<integer>] is what is referred to as the pointer to the node, <nodetype> is an atom, and the <nodes_as_lists> are the node's children each represented in an analogous nested list form.

right_sibling(?R,+L)
---

Defined in File: ENGINE.ARI

Argument Descriptions: The argument R is a variable or a node pointer. The argument L is a node pointer. R and L point to nodes in an abstract syntax tree. R points to a right_sibling of the node pointed to by L.

Predicate Description: Right_sibling/2 is a reflexive relation; i.e., right_sibling(X,X) will always succeed. R is a right_sibling of L if R = L, or if R's next_left_sibling is L, or if R is a right_sibling of S, whose next_left_sibling is L. With fully instantiated arguments, right_sibling/2 can be used to check if a known node pointer can be described as a right_sibling of a second node pointer. If R is uninstantiated and L is instantiated, then the predicate will instantiate R to be a pointer to a node that is a right_sibling of the node pointed to by L. Upon backtracking, R will be instantiated to a node pointer that corresponds to another of the right_siblings of the node L points to.

Predicate Technical Description: If the two arguments to right_sibling/2 can be unified, then right_sibling/2 returns successfully. Otherwise, proper_right_sibling/2 is called to determine the relationship between the two arguments.

root_node(?Ptr)
---

Defined in File: The root_node/1 assertion is not defined in any particular file, but is dynamically generated by the predicate parse/1.

Argument Description: The argument Ptr is a variable or a node pointer. Ptr points to the root node of the abstract syntax tree currently asserted in the Prolog database.

Predicate Description: One and only one root_node/1 assertion is made by parse/1 for any given Pascal program, i.e., no abstract syntax tree has more than one root. If Ptr is instantiated, root_node/1 can be used to check if a known node pointer points to the root of the current abstract syntax tree. If Ptr is uninstantiated, root_node(Ptr) will instantiate Ptr to the node pointer that points to the root of the current abstract syntax tree.

Predicate Technical Description: The predicate parse/1 asserts one instance of root_node/1 into the Prolog database after parsing a syntactically correct Pascal program.

top_level(?Messages)
_____

Defined in File: Each knowledge base must contain a unique definition of the predicate top_level/1.

Argument Description: Messages is a variable which, after top_level/1 has been successfully executed, will be instantiated to a list of messages.

Predicate Description: Every knowledge base must include a definition of top_level/1. Top_level/1 is the top level predicate of the knowledge base. It should be defined such that after a Pascal program has been parsed, execution of top_level/1 should apply the knowledge base to the task of analyzing the parsed Pascal program. Top_level/1 should instantiate the argument Messages to a list of messages containing comments about the Pascal program.

Predicate Technical Description: The definition of top_level/1 is uniquely defined in each knowledge base. It should be defined as the top level predicate of the knowledge base and, as such, should directly or indirectly reference all of the predicates defined in the knowledge base. Top_level/1 can be called only after parse/1 has been applied to a file containing a syntactically correct Pascal program.

DATA TYPE DEFINITIONS

The following section describes the data types utilized in the analytic component. Data types are listed alphabetically.

abstract syntax tree
formatted message
knowledge base pattern
message
node
node pattern
node pointer
node type
token abstract syntax tree

Data Type Description: Given the name of a file containing a syntactically correct Pascal program, parse/1 creates an abstract syntax tree for the program by adding four kinds of assertions into the current Prolog database:

parent_child/2, next_left_sibling/2, node_type/2, and root_node/1. The topology of an abstract syntax tree is defined by the set of all parent_child/2, next_left_sibling/2, node_type/2 and root_node/1 assertions that exist in the current database. The predicate parse/1 adds only one root_node(RootPtr) assertion to the database for each Pascal program parsed; RootPtr is the node pointer that points to the root node of the abstract syntax tree. The node type of any root node will always be the atom 'program'. An abstract syntax tree is a node.

BNF Description: Abstract syntax trees are nodes. See the BNF description of the data type node.

formatted message

Data Type Description: Given a Pascal program, the analytic component parses it, analyzes it, and then outputs the result of the analysis as a sequence of formatted messages. The file containing the formatted messages is read by the interface. Formatted messages consist of two pieces: two line numbers in the Pascal program (specified by two integers); and a string of comments. After the interface reads in a formatted message, it highlights the part of the Pascal program between the two line numbers, opens a window adjacent to the highlight Pascal code and writes the string of comments into the window. The predicate output_messages/2 outputs the formatted messages to a file to be read by the interface.

BNF Description:
```
<formatted message> ::= @ <integer> <integer> <newline>
                        <string> <newline> !
<string> ::= (<atom or newline>)
<atom or newline> ::= <atom> | <newline>
<newline> ::= new line character
``` knowledge base pattern

Data Type Description: Knowledge base patterns (also referred to as knowledge base pattern predicates) are Prolog clauses written by a knowledge engineer to analyze Pascal programs. A knowledge base consists of a set of knowledge base patterns. One knowledge base is written for each programming problem that might be assigned to students. To analyze a Pascal program, the contents of a knowledge base are matched against the parsed Pascal program.

BNF Description:
```
<pattern> ::= <pattern name><pattern args>:-<pattern body>|
              <pattern name> <pattern args>.
              <pattern name>.
<pattern name> ::= <atom>
<pattern list element> ::= <pattern list> |
                           <pattern string> |
```

```
                        <atom>|
                        <variable>
<pattern string> ::= $ (<atom>) $
<pattern list>   ::= [<pattern list element> (, <pattern list
                     element>) ] |
                     []
<pattern arg>    ::= <node pattern> |
                     <pattern list> |
                     <atom>         |
                     <variable>
<node pattern>   ::= see documentation for the data type node
                     pattern
<pattern args>   ::= ( <pattern arg> (, <pattern arg>) ) |
                     ( )                                 |
                     <empty>
<pattern body element> ::= not ( <pattern body element> ) |
                     not <pattern body element>           |
                     messages (<pattern list>, <variable>)|
                     <pattern name> <pattern args>        |
                     <pattern body expression>            |
                     <pattern name>
<pattern body expression> ::=<pattern body element lhs arg>
                     <pattern body element operator>
                     <pattern body element rhs arg>
<pattern body element lhs arg> ::= <atom> | <variable>
<pattern body element operator> ::= \== | =\= | >= | =< |
                     == | is | = | >  | <   | +   | -
                     | * | / | mod
<pattern body element rhs arg>::=<pattern body expression>|
                     <pattern body element lhs arg>
<pattern body>   ::= <pattern body element> (, <pattern body
                     element>) . | .
``` message

Data Type Description: One or more messages can be
associated with any pattern in a knowledge base. If the
pattern is matched against a Pascal program, then any
variables in the messages are instantiated and the contents
of the messages are output to the user by
output_messages/2. The predicate messages/2 is used to
append messages together. It accepts a list of messages in
its first argument, appends them together and puts the
result in its second argument. Messages are three element
lists. Only messages of the form [bug,_,_] are output to
the user. Messages take one of three forms: [ok],
[method,_,_], or [bug,_,_]. The first element of a message
is its type. Ok are used as "place holder" nonsense
messages. Method messages describe correct aspects of a
pattern. Bug messages describe incorrect aspects of a
pattern. If a pattern is matched against a Pascal program,
then any bug messages associated with the pattern are
displayed to the user. The second element of a message is
either a node pointer or the "place holder" atom: *. If a
message is displayed to a user, then the interface will
highlight the part of the Pascal program pointed to by the
node pointer. Node pointers contain start and end lines.
All of the Pascal program between the start and end lines is highlighted. If the message contains a *, none of the
Pascal program is highlighted. The third element of a
message is a list of strings and atoms. The third element
of a message can also contain variables, but the variables
must be instantiated by the knowledge base pattern before
the message is displayed to the user. A special symbol is
provided to allow the author of the messages to specify
where newlines should be inserted into the text of the
message: nl causes a newline to be inserted.

BNF Description:
```
<message> ::= [<message type>,<node pointer>,<strings and
              atoms> ] |
              [ ok ]
<message type> ::= bug | method
<node pointer> ::= [<node id>,<start line>,<end line>] | *
<node id> ::= <atom>
<start line> ::= <integer>
<end line> ::= <integer>
<strings and atoms> ::= [<string or atom> (, <string or
              atom>) ] |
              []
<string or atom> ::= <string> | nl | <atom>
<string> ::= $ (atom) $
``` node

Data Type Description: The predicate parse/1 produces
nodes. Given the name of a file containing a syntactically
correct Pascal program, parse/1 creates an abstract syntax
tree for the Pascal program and asserts it into the current
Prolog database. The abstract syntax tree is, itself, a
node and contains, within it, a set of nodes. Nodes can be
represented either as nested lists or as sets of
parent_child/2, next_left_sibling/2, node_type/2, and
root_node/1 assertions. The predicate parse/1 asserts the
abstract syntax tree into the current Prolog database as a
set of assertions. The node pointer that points to the
root of the abstract syntax tree can be retrieved with the
query root_node(PtrToRootOfAST). The predicate
recreate_node/2 can be used to translate from the assertion
form of a node to a nested list format. For example, to
see the entire abstract syntax tree as a nested list one
could pose the following query to the Prolog interpreter
(after a syntactically correct Pascal program had been
parsed by the predicate parse/1):
 ?- root_node(Ptr),recreate_node(Ptr,NodeAsNestedList).

BNF Description: The following is a BNF description of the
data type node rendered as a nested list:

```
<node> ::= [ <node type>,<node pointer>,<node children> ]
<node type> ::= <atom>
<node pointer> ::= [ <node id>,<start line>,<end line> ]
<node id> ::= <atom>
<start line> ::= <integer>
<end line> ::= <integer>
<node children> ::= <node list>
```

`<node list> ::= [ <node> { , <node> } ] | []`

Notes: Each <node> contains a unique <node id>. <start line> refers to the line in the text of the Pascal program on which the node starts. <end line> refers to the line on which the node ends. <node type> is one of a specified set of acceptable types. The acceptable types will be defined below.

There are a limited set of <node type>s that the predicate parse/1 can produce. Nodes of a given type have specific types of children. Below is the definition of the types of children each node has. The formalism used to describe the node types and their children is presented here. Parent node types are left justified with their childrens' types appearing indented and on separate lines. More than one parent node type, on the same line and separated by commas, means that those parents have the same types of children. More than one child node type, on the same line and separated by commas, means that the child can be any one of the possible node types. In general, upper case designations represent possible terminals. The following always denote terminals:

LIT, INT, CON, EMPTY, TO, DOWNTO, POINTER_REFERENCE.

TO, DOWNTO, and POINTER_REFERENCE are actual terminals, while LIT, INT, and CON represent terminals as follows:

LIT == a string terminal, usually a Pascal identifier.
INT == an integer terminal.
CON == a pascal constant terminal, including integers.

In addition to these, there are a number of nodes which are sometimes terminals and sometimes non-terminals. These are:
prog_header
label_decl_list
const_decl_list
type_decl_list
var_decl_list
procedure_and_function_list
procedure_param
begin
set.

EXP represents any member of the following list of terminals and non-terminals:

EXP == *, /, div, mod, and, +, -, or, =, <, >, <=, >=, <>,
       not, unary_minus, function_call, set, variable, CON

NODE TYPES:

program
       LIT
       prog_header
       block

```
prog_header
        LIT
          :
          :         (0 or more)

block
        label_decl_list
        const_decl_list
        type_decl_list
        var_decl_list
        procedure_and_function_list
        begin label_decl_list
        INT
          :
          :         (0 or more)

const_decl_list
        const_decl
          :
          :         (0 or more)

const_decl
        LIT
        LIT, CON type_decl_list
        type_decl
          :
          :         (0 or more)

type_decl
        LIT
        pointer_to, array_of, packed_array_of, file_of,
        packed_file_of, set_of, packed_set_of, record,
        packed_record, collection_type, range_type,
        defined_type var_decl_list
        var_decl
          :
          :         (0 or more)

var_decl
        pointer_to, array_of, packed_array_of, file_of,
        packed_file_of, set_of, packed_set_of, record,
        packed_record, collection_type, range_type,
        defined_type
        LIT
          :
          :         (1 or more)
```

TYPE NODES: The following represent the constructed types that can appear in declarations for variables, types, and certain parameters:

```
collection_type
        LIT
          :
```

```
                :
                :         (1 or more)

range_type
        LIT, CON
        LIT, CON defined_type
        LIT
pointer_to
        LIT array_of, packed_array_of
        pointer_to, array_of, packed_array_of, file_of,
        packed_file_of, set_of, packed_set_of, record,
        packed_record, collection_type, range_type,
        defined_type
        collection_type, range_type
                :
                :         (1 or more)

file_of, packed_file_of
        pointer_to, array_of, packed_array_of, file_of,
        packed_file_of, set_of, packed_set_of, record,
        packed_record, collection_type, range_type,
        defined_type set_of, packed_set_of
        pointer_to, array_of, packed_array_of, file_of,
        packed_file_of, set_of, packed_set_of, record,
        packed_record, collection_type, range_type,
        defined_type record, packed_record
        field_list field_list
        field_simple_list, field_case_list
                :
                :    (0 or more)

field_simple_list
        LIT
                :
                :    (1 or more)
        LIT field_case_list
        LIT
        LIT
        CON
                :
                :    (1 or more)
        field_list
                :
                :    ( 0 or more)
```

PROCEDURE/FUNCTION NODES: The following are nodes for procedure/function declarations and their constituent parameters:

```
procedure_and_function_list
        procedure, function
        :
        :       (0 or more)

procedure
        LIT
        param_list
        block function
        LIT             (name)
        param_list
        LIT             (type)
        block param_list
        function_param, var_param, value_param,
        procedure_param
        :
        :       (1 or more)

func_param, var_param, value_param
        defined_type
        LIT
        :
        :       (1 or more)

procedure_param
        LIT
        :
        :       (0 or more)
```

STATEMENT NODES:

```
begin
        begin, :=, read, readln, write, writeln, if,
        for, while,
        repeat, case, with, goto, procedure_call
        :
        :       (0 or more)

:=
        variable
        EXP read, readln
        variable
        :
        :       (1 or more)

write, writeln
        write_arg
        :
        :       (1 or more)

write_arg
        EXP
        LIT, CON, EMPTY         (print field width)
        LIT, CON, EMPTY         (fraction field width)
```

```
if
        EXP
        begin, :=, read, readln, write, writeln, if,
        for, while,
        repeat, case, with, goto, procedure_call
        begin, :=, read, readln, write, writeln, if,
        for, while,
        repeat, case, with, goto, procedure_call for
        for_assign
        begin, :=, read, readln, write, writeln, if,.
        for, while,
        repeat, case, with, goto, procedure_call for_assign
        LIT
        EXP
        TO, DOWNTO
        EXP while
        EXP
        begin, :=, read, readln, write, writeln, if,
        for, while,
        repeat, case, with, goto, procedure_call repeat
        EXP
        begin, :=, read, readln, write, writeln, if,
        for, while,
        repeat, case, with, goto, procedure_call
          :
          :        (1 or more)

case
        EXP case_alternative
          :
          :        (1 or more)

case_alternative
        CON
          :
          :        (1 or more)
        statement with
        variable
          :
          :        (1 or more)
        statement goto
        INT procedure_call
        LIT
        EXP
```

:
:        (0 or more)

VARIABLE NODES:

variable
    LIT
    var_modifier_list, empty var_modifier_list
    var_modifier
    :
    :        (1 or more)

var_modifier
    array_index, field_index, POINTER_REFERENCE array_index
    EXP
    :
    :        (1 or more)

field_index
    LIT

EXPRESSION NODES: The EXP nodes are any of the following:
    *, /, div, mod, and, +, -, or, =, <, >, <=, >=, <>,
    not, unary_minus, function_call, SET, variable, CON The children of these are given below.

*, /, div, mod, and, +, -, or, =, <, >, <=, >=, <>
    EXP
    EXP not, unary_minus
    EXP function_call
    LIT node pattern

Data Type Description: Node patterns are used as arguments to the predicate match/1. They are syntactically isomorphic to nodes in nested list format, except that node patterns can contain Prolog variables. Node patterns are written to match against nodes in the abstract syntax tree.

BNF Description:
<node pattern> ::= [<node pattern type>,
                    <node pattern pointer>,
                    <node pattern children>]   |
                   <variable>
<node pattern type> ::= <number> | <variable> | <atom>
<node pattern pointer> ::= [<node id>,<start line>,
                    <end line>] |

```
                        <variable> |
<node id> ::= <atom> | <variable>
<start line> ::= <integer> | <variable>
<end line> ::= <integer> | <variable>
<node pattern child> ::= <node pattern> | <variable>
<node pattern children> ::= [ <node pattern child>
                    <rest node children> ] |

[ ]                |
                    <variable>
<rest node children> ::= (, <node pattern child>) |
            '|' <variable>
``` node pointer

Data Type Description: Node pointers are three element lists that function as unique identifiers for every node in the abstract syntax tree generated by the predicate parse/1. The first element of the list is a unique atom; the second is an integer that indicates the line in the original Pascal program on which the node starts; the third element indicates the line on which the node ends. Node pointers are generated by the predicate parse/1 during the parsing of a Pascal program. Node pointers are used as arguments by many predicates including ancestor, descendent, above, below, left_sibling, etc.

BNF Description:
```
<node pointer> ::= [ <node id>,<start line>,<end line>]
<node id> ::= <atom>
<start line> ::= <integer>
<end line> ::= <integer>
```

Notes: Each <node pointer> contains a unique <node id>. <start line> refers to the line in the text of the Pascal program on which the node starts. <end line> refers to the line on which the node ends.

node type

Data Type Description: Node types are atoms like program, if, *, for_assign, etc. Also, node types can be numbers like 3 or 7.01. They indicate the type of a node.

BNF Description:
Listed in the documentation for the data type node is a description of all of the possible node types. Node types start in the leftmost column of the page. Below each node type is a list of the possible node types of the children.

token

Data Type Description: Tokens are produced by the predicate open_file_and_lex_tokens/2. The predicate open_file_and_lex_tokens/2 accepts a file name and returns a list of tokens. Each separate symbol found in a file is packaged into a token. A token is a two element list. The first element is the symbol found and the second element is an integer which denotes the line number in the file on which the symbol was found by the lexer.

BNF Description:
<token> ::= [ <atom> , <integer> ]

We claim:

1. A method of evaluating a solution program input to a computer in response to a computer science problem in which the solution program may contain a plurality of errors, said method comprising the steps of:
   a) converting the solution program in response t the computer science problem into an abstract syntax tree representation;
   b) comparing a first predetermined pattern against a first portion of the abstract syntax tree, said first portion representing certain nodes of the abstract syntax tree;
   c) repeating step (b) against a plurality of portions of the abstract syntax tree until the first predetermined pattern matches a portion of the abstract syntax tree; wherein the first predetermined pattern has been specified so as to match a range of abstract syntax tree portion; and
   d) providing information correlated to the first predetermined pattern so matched; wherein said information is a textual message indicative of the correctness of the solution program.

2. The method of claim 1 further comprising the steps of:
   e) comparing a subsequent predetermined pattern against the first pattern the first portion of the abstract syntax tree;
   f) repeating step (e) against a plurality of portions of the abstract syntax tree until the subsequent predetermined pattern matches a portion of the abstract syntax tree;
   g) providing information correlated to the subsequent predetermined pattern so matched; wherein said information is a textual message indicative of the correctness of the solution program; and
   h) repeating steps (e), (f) and (g) for a plurality of sequent predetermined patterns.

3. The method of claim 2 in which the information provided further comprises a weighted score.

4. The method of claim 3 in which the converting step comprises the steps of:
   (i) lexing the solution program into a list of tokens, each token being representative of a part of the solution program and its location within the solution program and
   (ii) parsing the list of tokens into an abstract syntax tree representation.

5. The method of claim 4 wherein the lexing step and the parsing step are implemented in Prolog programs.

6. The method of claim 5 wherein the Prolog programs that implement the lexing step and parsing step comprises LEXER.ARI and PARSER.ARI programs.

7. The method of claim 6 in which the Prolog program that implements steps (b) and (c) of the method comprises ENGINE.ARI program.

8. The method of claim 1 in which the computer science problem is an open-ended problem.

9. The method of claim 1 in which the computer science problem is a completion problem.

10. The method of claim 1 in which the computer science problem is a faulty solution problem.

11. A method of administering to a student a problem in computer science for analysis and feedback comprising the steps of:
    a) providing an item pool to the student, said item pool comprising a plurality of predetermined test problems in computer science to be selected by the student;
    b) recording the student's solution program to a particular test problem selected;
    c) lexing the solution program into a list of tokens, each token being representative of a part of the solution program and its location within the solution program;
    d) parsing the list of tokens into an abstract syntax tree representation;
    e) comparing a predetermined pattern against a first portion of the abstract syntax tree;
    f) repeating the comparison step with a plurality of portions of the abstract syntax tree until the predetermined pattern matches a portion of the abstract syntax tree;
    g) repeating steps (e) and (f) for a plurality of predetermined patterns;
    h) providing to the student text messages correlated to the predetermined patterns so matched;
    whereby the student is automatically provided with information embodied in the text messages which is indicative of the correctness or incorrectness of the solution text entered by the student in response to the test problem selected.

12. A method of administering an examination in computer science to a student comprising the steps of:
    a) providing to the student a predetermined test problem in computer science from an item pool comprising a plurality of different predetermined test problems;
    b) recording the student's solution program in computer science to the predetermined test problem so provided;
    c) lexing the solution program into a list of tokens, each token being representative of a part of the solution program and its location within the solution program;

d) parsing the list of tokens into an abstract syntax tree representation;

e) comparing a predetermined pattern against a first portion of the abstract syntax tree;

f) repeating the comparison step with a plurality of portions of the abstract syntax tree until the predetermined pattern matches a portion of the abstract syntax tree;

g) repeating steps (e) and (f) for a plurality of predetermined patterns; and h) storing a score correlated to the predetermined patterns so matched;

whereby the student's solution program to the predetermined test problem is automatically evaluated and scored, the score being indicative of the correctness or incorrectness of the solution text entered by the student in response to the test problem provided.

13. The method of claim 12 further comprising the steps of:

i) eliminating from the item pool the predetermined test problem already provided to the student;

j) repeating steps (a) through (i) a predetermined number of times;

k) storing a cumulative score indicative of all the scores stored in step (h);

whereby the cumulative score is indicative of the student's ability in computer science.

14. A computer system for administering a problem for analysis and feedback in a computer science programming language to a student, said system comprising:

a) a user interface comprising i) an item pool comprising a plurality of predetermined test problems in computer science to be selected by the student;

ii) output means for providing to the student the particular test problem selected; and iii) input means for providing communications from the student to the system;

iv) editor means for recording to student's solution program in computer science to the particular test problem selected;

b) a knowledge base comprising a set of predetermined knowledge base patterns;

c) an analytic component comprising i) means for converting the student's solution program into an abstract syntax tree;

ii) means for comparing each of the predetermined knowledge base patterns against portions of the abstract syntax tree until matched successfully; and d) means for providing to the output means of the user interface a text message correlated to the knowledge base patterns so matched;

whereby the student is automatically provided with information embodies in the text message which is indicative of the correctness of the solution text entered by the student in response to the test problem selected.

15. The computer system of claim 14 in which the converting means comprises:

A) means for system of claim 14 in which the converting means comprises:

A) means for lexing the student's solution program into a list of tokens, each token being representative of a part of the solution program and its location within the solution program; and B) means for parsing the list of tokens into an abstract syntax tree.

16. The computer system of claim 15 including means for implementing Prolog programs;

wherein the Prolog programs comprises LEXER.ARI, PARSER.ARI and ENGINE.ARI programs.

17. The computer system of claim 16 in which the means for lexing is implemented by the LEXER.ARI program, the means for parsing is implemented by the PARSER.ARI program, and the means for comparing is implemented by the ENGINE.ARI program.

18. An expert system for evaluating a solution program into to a computer in response to a computer science problem comprising:

a) interface means for providing communication to and from a user;

b) lexing means for converting said solution program into a list of tokens, each of said tokens being representative of a part of the solution program and its location within the solution program;

c) parsing means for converting the list of tokens produced by the lexing means into an abstract syntax tree representation of the solution program;

d) a knowledge base comprising a plurality of predetermined knowledge base patterns wherein each of said knowledge base patterns represent a certain part of a model solution program;

e) an inference engine comprising means for comparing each of said knowledge base patterns against portions of the abstract syntax tree until successfully matched; and f) means for providing to the interface output messages correlated to the knowledge base patterns successfully matched.

19. The expert system of claim 18 including means for implementing Prolog programs;

wherein the Prolog programs comprise LEXER.ARI, PARSER.ARI and ENGINE.ARI programs;

and wherein the lexing means is implemented by the LEXER.ARI, the parsing means is implemented by the PARSER.ARI, and the inference engine is implemented by the ENGINE.ARI program.

20. A method for interactively compiling knowledge base patterns of computer science programs for matching against portions of abstract syntax tree representations of model solution programs in response to the computer science problems, said method comprising the steps of:

a) lexing a model program into a list of tokens, each of said tokens being representative of a part of the model program and its location within the model program;

b) parsing the list of tokens into an abstract syntax tree representation of the model program;

c) querying a user to select the part of the model program against which the knowledge base pattern will be used to compare; and d) generating a knowledge base pattern in accordance with the user's selection such that said knowledge base pattern will match against a portion of the abstract syntax tree correlated to the part of the model program selected by the user.

21. The method of claim 20 further comprising the steps of allowing the user to specify node relations of the knowledge base pattern in accordance with desired match criteria.

22. A method of administering to a student problems in computer science for analysis and feedback comprising the steps of:
   a) providing an item pool to the student, said item pool comprising a plurality of predetermined test problems in computer science to be selected by the student;
   b) recording the student's solution program to a particular test problem selected;
   c) lexing the solution program into a list of tokens, each token being representative of a part of the solution program and its location within the solution program;
   d) parsing the list of tokens into an abstract syntax tree representation;
   e) comparing a predetermined pattern against a first portion of the abstract syntax tree;
   f) repeating the comparison step with a plurality of portions of the abstract syntax tree until the predetermined pattern matches a portion of the abstract syntax tree;
   g) repeating steps (e) and (f) for a plurality of predetermined patterns;
   h) providing to the student text messages correlated to the predetermined patterns so matched; and
   i) storing a score correlated to the predetermined patterns so matched;
   whereby the student is automatically provided with a score and information embodied in the text messages which is indicative of the correctness or incorrectness of the solution text entered by the student in response to the test problem selected.

* * * * *

UNITED STATES PATENT AND TRADEMARK OFFICE
CERTIFICATE OF CORRECTION

PATENT NO. : 5,259,766

DATED : November 9, 1993

INVENTOR(S) : WARREN SACK, et al.

It is certified that error appears in the above-identified patent and that said Letters Patent is hereby corrected as shown below:

On the title page: Item [54] and

Col. 1, line 3 (title), "ANAYLSIS" should read "ANALYSIS";

Col. 1, line 25, "stored" should read "scored";

Col. 1, line 32, "academica" should read "academic";

Col. 1, lines 54-55, "examineers" should read "examinee's";

Col. 5, line 56, "pregtam" should read "program";

Col. 15, line 8, delete "io"

Col. 19, line 2, "the size of the array are passed into the" should read "the size of the array are passed into the procedure";

Col. 19, line 4, "one place to the" should read "one place to the right:";

Col. 19, line 58, "A[LHSExpr]A[RHSExpr]" should read "A[LHSExpr] := A[RHSExpr]";

Col. 20, line 52, "A2[LHSExpr1]A1[RHSExpr1]" should read "A2[LHSExpr1] := A1[RHSExpr1]";

UNITED STATES PATENT AND TRADEMARK OFFICE
CERTIFICATE OF CORRECTION

PATENT NO. : 5,259,766

DATED : November 9, 1993

INVENTOR(S) : WARREN SACK, et al.

It is certified that error appears in the above-identified patent and that said Letters Patent is hereby corrected as shown below:

Col. 20, line 53, "A1[LHSExpr2]A2[RHSExpr2]" should read "A1[LHSExpr2] := A2[RHSExpr2]";

Col. 20, line 67, "UiSExpr1" should read "LHSExpr1";

Col. 21, line 4, "PHSExpr1" should read "RHSExpr1";

Col. 21, line 30, "IJiSExpr1" should read "LHSExpr1";

Col. 22, lines 43-44, "Construction of Knowledge Base Pattern Predicates" should be a centered heading for the next section and not the last sentence of the previous paragraph;

Col. 27, line 48, "= pattern to find + message" should be to the left of "predicate" not "base";

Col. 29, lines 55-56, "predicates one of the node" should read "predicates. One of the node";

Col. 87, line 23 (claim 1), "in response the" should read "in response to the";

Col. 87, line 35 (claim 1), "portion" should read "portions";

UNITED STATES PATENT AND TRADEMARK OFFICE
CERTIFICATE OF CORRECTION

PATENT NO. : 5,259,766

DATED : November 9, 1993

INVENTOR(S) : WARREN SACK, et al.

It is certified that error appears in the above-identified patent and that said Letters Patent is hereby corrected as shown below:

Col. 87, line 54 (claim 2), "sequent" should read "subsequent";

Col. 87, line 35 (claim 1), "portion" should read "portions";

Col. 87, line 54 (claim 2), "sequent" should read "subsequent";

Col. 89, line 58 (claim 14, "embodies" should read "embodied";

Col. 89, lines 64-65 (claim 15), "A) means for system of claim 14 in which the converting means comprises:" should be deleted;

Col. 90, line 15 (claim 18), "into" should read "input".

Source Code Appendix

Signed and Sealed this

Sixteenth Day of August, 1994

Attest:

BRUCE LEHMAN

Attesting Officer

Commissioner of Patents and Trademarks